(12) United States Patent
Bae et al.

(10) Patent No.: US 8,018,813 B2
(45) Date of Patent: Sep. 13, 2011

(54) HOLOGRAPHIC INFORMATION RECORDING AND/OR REPRODUCING APPARATUS

(75) Inventors: Jae-cheol Bae, Suwon-si (KR);
Taek-seong Jeong, Suwon-si (KR);
Tae-kyung Kim, Seoul (KR); Da-hye Chol, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 545 days.

(21) Appl. No.: 12/233,066

(22) Filed: Sep. 18, 2008

(65) Prior Publication Data

US 2009/0168629 A1    Jul. 2, 2009

(30) Foreign Application Priority Data

Dec. 28, 2007   (KR) ................ 10-2007-0140557

(51) Int. Cl.
*G11B 7/00* (2006.01)
*G03H 1/00* (2006.01)
(52) U.S. Cl. .............. 369/103; 359/31; 369/112.17; 369/112.28; 369/112.29
(58) Field of Classification Search .......... 369/103; 359/31
See application file for complete search history.

(56) References Cited

U.S. PATENT DOCUMENTS

| | | | |
|---|---|---|---|
| 6,859,293 B2 | 2/2005 | Klug et al. | |
| 7,072,270 B2 | 7/2006 | Nakao | |
| 7,839,750 B2 * | 11/2010 | Horinouchi et al. | 369/103 |
| 2005/0195722 A1 | 9/2005 | Tsukamoto et al. | |

FOREIGN PATENT DOCUMENTS

| | | |
|---|---|---|
| EP | 1 471 507 A2 | 10/2004 |
| EP | 1 734 515 A1 | 12/2006 |
| KR | 2001-87984 | 9/2001 |
| KR | 2005-116854 | 12/2005 |
| WO | WO 2009/075476 A2 | 6/2009 |

OTHER PUBLICATIONS

International Search Report and Written Opinion issued in corresponding International Application No. PCT/KR2008/006459 dated May 26, 2009.
Supplementary European Search Report issrued on Apr. 21, 2011 in counterpart European Application No. EP 08 86 6998 (9 pages, in English).

* cited by examiner

*Primary Examiner* — Aristotelis Psitos
(74) *Attorney, Agent, or Firm* — NSIP Law

(57) ABSTRACT

A holographic information recording and/or reproducing apparatus including: a light source unit emitting reference light and signal light; a first optical path guiding unit guiding the lights to cross; a second optical path guiding unit including a first polarization converter located on an optical path of one of the reference and signal lights, a first polarization beam splitter located at a crossing point of the reference light and the signal light, an optical path converter guiding the reference light and the signal light so that they cross again, a second polarization converter located on an optical path of the signal light before the signal light crosses the reference light, and a second polarization beam splitter uniting the optical paths of the reference light and the signal light; and an objective lens unit illuminating the reference light and the signal light onto one side of a holographic information storage medium.

46 Claims, 11 Drawing Sheets

HOLOGRAPHIC INFORMATION RECORDING AND/OR REPRODUCING APPARATUS

CROSS-REFERENCE TO RELATED PATENT APPLICATION

This application claims the benefit of Korean Patent Application No. 2007-140557, filed on Dec. 28, 2007, in the Korean Intellectual Property Office, the disclosure of which is incorporated herein in its entirety by reference.

BACKGROUND OF THE INVENTION

1. Field of the Invention

Aspects of the present invention relate to a holographic information recording and/or reproducing apparatus, and more particularly, to a holographic information recording and/or reproducing apparatus using a single side incidence method for enhancing efficiency of an optical system.

2. Description of the Related Art

Recently, technologies for recording information using a hologram have become available on the market. According to an information recording method using the hologram, information is stored in a light sensitive inorganic crystal or polymer material in an optical interference pattern. Optical interference fringes are formed by using two laser beams having coherency. That is, information is recorded by optical interference fringes, which are formed by interference between a reference light and a signal light having difference paths, causing a chemical or physical change on a photosensitive storage medium. In order to reproduce information from such a recorded interference pattern, a reproduction light similar to the reference light used when recording is illuminated onto the interference pattern recorded on the storage medium. This reproduction light causes diffraction due to the interference pattern, whereby the signal light is restored and the information is reproduced.

In the hologram information recording technology, there is a volume holography method in which recording and reproducing are performed in a page unit using volume holography, and there is a micro holography method in which recording and reproducing are performed in a single bit unit using micro holography. The volume holography method has an advantage in that bulk information can be processed at the same time. However, since an optical system is minutely controlled, it is difficult for the volume holography method to be commercialized for an information storage apparatus for general users.

The micro holography method records information in a storage medium in a three dimensional method by forming a minute interference pattern by making two concentrated beams interfere with each other at a focus and forming an information plane by moving the interference fringes on a plane of the storage medium. The micro holography method layeredly records the information plane in a depth direction of the storage medium. However, a conventional recording and/or reproducing apparatus using the micro holography method includes an optical system for a signal light and an optical system for a reference light, each light being illuminated onto both sides of a storage medium. Thus, the illuminating of the signal light and the reference light onto both sides of the storage medium results in complexity for an optical system.

SUMMARY OF THE INVENTION

Aspects of the present invention provide a holographic information recording and/or reproducing apparatus to enhance an efficiency of illuminated light by making signal light and reference light incident on a single side of a holographic information storage medium.

According to an aspect of the present invention, there is provided a holographic information recording and/or reproducing apparatus to record and/or reproduce information to/from a holographic information storage medium, the holographic information recording and/or reproducing apparatus including: a first light source unit to emit a reference light and a signal light in a recording mode, each being linear polarized light and orthogonal to each other; a first optical path guiding unit to guide the reference light and the signal light emitted by the first light source unit so that the reference light and the signal light cross each other at a first crossing point after passing through different optical paths; a second optical path guiding unit including a first polarization converter being located on an optical path of the reference light or the signal light before the first crossing point, a first polarization beam splitter located at the first crossing point of the reference light and the signal light, at least one first optical path converter to guide the reference light and/or the signal light so that the reference light and the signal light cross again at a second crossing point after the first crossing point, a second polarization converter located on the optical path of the signal light before the second crossing point after passing through the first polarization beam splitter, and a second polarization beam splitter located at the second crossing point to unite the optical paths of the reference light and the signal light; and an objective lens unit to illuminate the reference light and the signal light that have passed through the second polarization beam splitter onto a single side of a holographic information storage medium.

The first polarization converter, the second polarization converter, the first polarization beam splitter, the second polarization beam splitter, the at least one first optical path converter, and/or the second polarization converter may be combined into one body.

The objective lens unit may include: a quarter-wave plate to polarization-convert the reference light and the signal light to be orthogonally polarized to each other; and an objective lens to cause the information to be recorded by interference fringes formed in a depth direction of the holographic information storage medium around a focus formed by directly focusing the reference light on a focal point of the holographic information storage medium, reflecting the signal light from a reflection layer of the holographic information storage medium without polarization conversion, and focusing the reflected signal light on the focal point of the reference light.

The objective lens unit may include: a fourth polarization converter to polarization-convert the reference light and the signal light to a linear polarized light in a same polarization direction; a quarter-wave plate to polarization-convert the reference light and the signal light to a same-directional circular polarized light; and an objective lens to cause the information to be recorded by interference fringes formed in a depth direction of the holographic information storage medium around a focus formed by directly focusing the reference light on a focal point of the holographic information storage medium, reflecting the signal light from a reflection layer of the holographic information storage medium with polarization conversion, and focusing the reflected signal light on the focal point of the reference light.

According to another aspect of the present invention, there is provided a holographic information recording and/or reproducing apparatus to record and/or reproduce information to/from a holographic information storage medium, the holographic information recording and/or reproducing apparatus including: a first light source unit to emit a reference light and a signal light in a recording mode, each being linear polarized light and orthogonal to each other; a first optical path guiding unit to guide the reference light and the signal light emitted by the first light source unit so that the reference light and the signal light cross each other at a first crossing point after passing through different optical paths; a second optical path guiding unit to guide the reference light and/or the signal light so that the reference light and the signal light cross again at a second crossing point after passing through different optical paths after the first crossing point; and an objective lens unit to illuminate the reference light and the signal light that have passed through the second polarization beam splitter onto a single side of the holographic information storage medium.

According to still another aspect of the present invention, there is provided a holographic information recording and/or reproducing apparatus to record and/or reproduce information to/from a holographic information storage medium, the holographic information recording and/or reproducing apparatus including: a first optical path guiding unit to guide a reference light and a signal light, each being linear polarized light and orthogonal to each other, so that the reference light and the signal light cross each other at a first crossing point after passing through different optical paths; a second optical path guiding unit to guide the reference light and/or the signal light so that the reference light and the signal light cross again at a second crossing point after passing through different optical paths after the first crossing point; and an objective lens unit to illuminate the reference light and the signal light that have passed through the second polarization beam splitter onto a single side of the holographic information storage medium.

According to another aspect of the present invention, there is provided a method of recording information to a holographic information storage medium, the method including: emitting a reference light and a signal light, each being linear polarized and orthogonal to each other; guiding the emitted reference light and the emitted signal light so that the reference light and the signal light cross each other at a first crossing point after passing through different optical paths; uniting the optical paths of the reference light and the signal light; and illuminating the reference light and the signal light onto a single side of the holographic information storage medium.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENT

Figure 1:
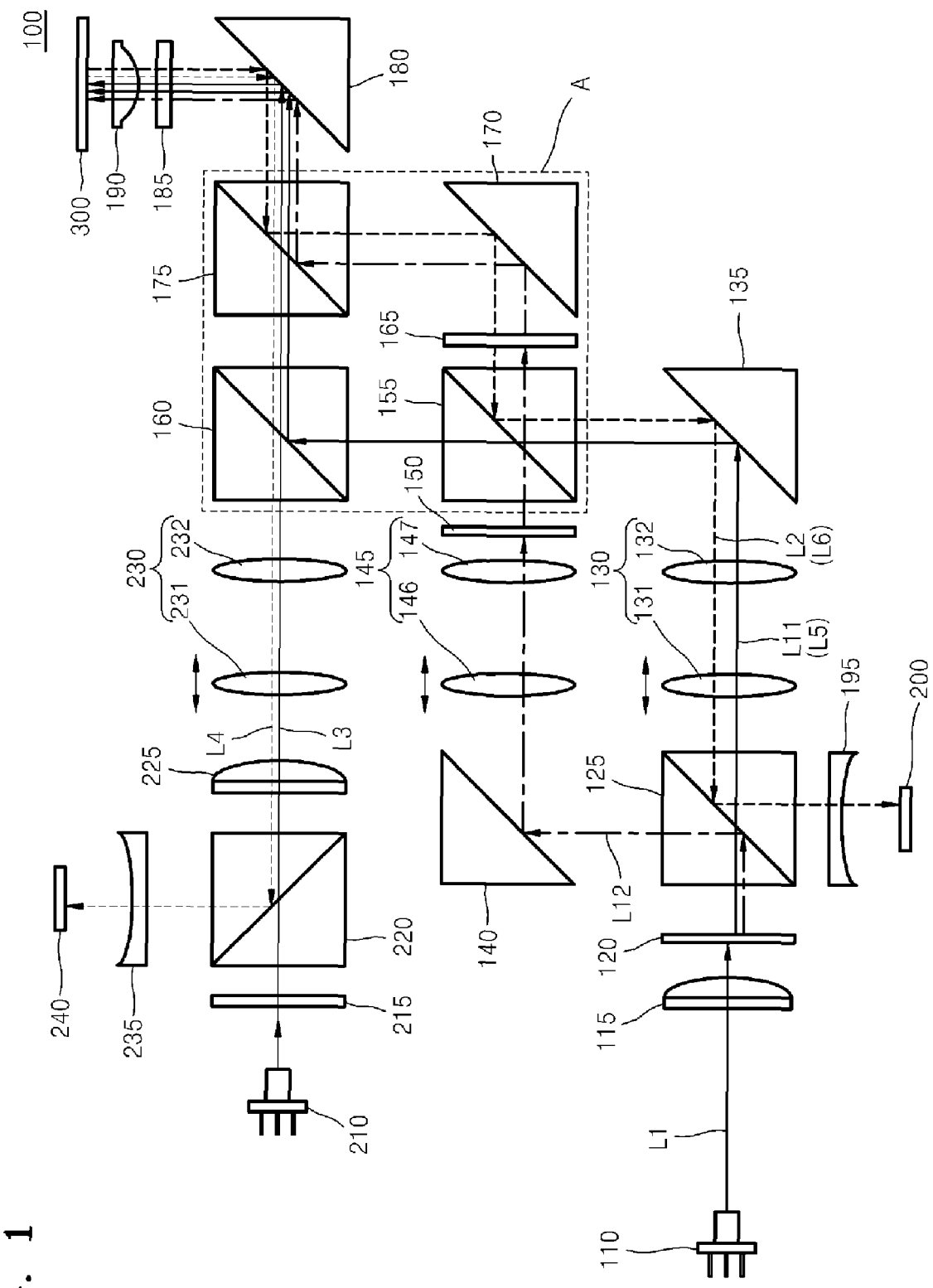
FIG. 1 is a schematic optical configuration of a holographic information recording and/or reproducing apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a schematic optical configuration of a holographic information recording and/or reproducing apparatus according to an embodiment of the present invention. Referring to FIG. 1, the holographic information recording and/or reproducing apparatus records information on a holographic information storage medium 300 and reproduces recorded information. In particular, the holographic information recording and/or reproducing apparatus includes a circuit (not shown) and an optical system including an optical pickup 100 illuminating light onto a single side of the holographic information storage medium 300 and receiving the illuminated light.

The optical pickup 100 includes a first light source 110, a first collimating lens 115, a third polarization converter 120, a third polarization beam splitter 125, first and second focus controlling units 130 and 145, first and second mirrors 135 and 140, a first polarization converter 150, a first polarization beam splitter 155, a second polarization converter 165, a third mirror 170, a wavelength selective beam splitter 160, a second polarization beam splitter 175, a fourth mirror 180, a quarter-wave plate 185, an objective lens 190, a concentration lens 195, and a first optical detector 200. In order to read servo information, the optical pickup 100 further includes a servo optical system including a second light source 210, a diffraction grating 215, a servo light polarization beam splitter 220, a second collimating lens 225, a servo light focus controlling unit 230, a detection lens 235, and a second optical detector 240.

In FIG. 1, a thick solid line indicates a reference light L11 or a reproduction light L5 emitted from the first light source 110 to the holographic information storage medium 300, a thick alternate long and short dash line indicates a signal light L12 emitted from the first light source 110 to the holographic information storage medium 300, a thick dotted line indicates a reflected signal light L2 or a reflected reproduction light L6 reflected from the holographic information storage medium 300 to the first optical detector 200, a thin solid line indicates a servo light L3 emitted from the second light source 210 to the holographic information storage medium 300, and a thin dotted line indicates a reflected servo light L4 reflected from the holographic information storage medium 300 to the second optical detector 240.

The first light source 110, the first collimating lens 115, and the third polarization converter 120 are included in a first light source unit emitting the reference light L11 and the signal light L12 in a recording mode and emitting the reproduction light L5 in a reproduction mode. The first light source 110 emits a light L1 for recording and reproduction that has a one-directional linear polarization (for example, a semiconductor laser diode emitting blue light). The light L1 for recording and reproduction is emitted in a modulated state according to information to be recorded in the recording mode and emitted in a non-modulated state in the reproduction mode. Hereinafter, it is assumed for convenience of description that a linear polarization direction of the light L1 for recording and reproduction is a P-polarization direction.

The first collimating lens 115 regularizes the light L1 for recording and reproduction to an equilibrium light.

The third polarization converter 120 is an active device (e.g., an active half-wave plate) of which a polarization conversion function is turned on or off according to a turn-over between the recording mode and the reproduction mode. The third polarization converter 120 polarization-converts the light emitted by the first light source 110 to a light having, for example, polarization components of P-polarization and S-polarization by acting as a wave plate in the recording mode. Furthermore, the third polarization converter 120 passes the light emitted by the first light source 110 as is without acting as the wave plate. For this active wave plate, a liquid crystal device that uses a birefringence characteristic of a liquid crystal having an optical axis by being arranged when a voltage is applied may be used. For example, when a voltage is applied to the active half-wave plate, if an angle between a linear polarization direction of incident light and a fast axis of the active half-wave plate is a degree excluding 45°, (such as 22.5°), the incident light (e.g., a P-polarized light) is converted to light having two orthogonal polarization components (i.e., a P-polarization component and an S-polarization component) due to a rotation of the polarization direction of the incident light while passing through the active half-wave plate. The P-polarization component and the S-polarization component of which the polarization directions are rotated correspond to the reference light L11 and the signal light L12 in the recording mode, respectively. Since a configuration of the active half-wave plate is well known by one of ordinary skill in the art, a detailed description will be omitted herein. Although the active half-wave plate is described as a polarization converter in the current embodiment, aspects of the present invention are not limited thereof. For example, a drivable wave plate that is located on an optical path in the recording mode and removed from the optical path in the reproduction mode by a mechanical driving unit may also be used as the polarization converter.

The third polarization beam splitter 125, the first and second focus controlling units 130 and 145, and the first and second mirrors 135 and 140 are included in a first optical path guiding unit to guide the reference light L11 and the signal light L12, which have been emitted by the first light source unit, so that the reference light L11 and the signal light L12 cross each other after passing through different optical paths.

The third polarization beam splitter 125 determines a transmission or a reflection of light according to a polarization direction of the light. For example, the third polarization beam splitter 125 may transmit P-polarized light and reflect S-polarized light. Accordingly, the third polarization beam splitter 125 can split optical paths of the reference light L11 and the signal light L12 by transmitting the reference light L11 that is, for example, P-polarized light in the recording mode, and reflecting the signal light L12 that is, for example, S-polarized light in the reproduction mode. As described later, a portion of the signal light L2 reflected from the holographic information storage medium 300 is input to the third polarization beam splitter 125 by passing backward along the optical path of the reference light L11 and reflected to the first optical detector 200. In addition, as described later, since a polarization direction of the reproduction light L5 illuminated onto the holographic information storage medium 300 is orthogonal to a polarization direction of the reproduction light L6 reflected from the holographic information storage medium 300 in the reproduction mode, the third polarization beam splitter 125 can separate the reproduction light L6 reflected from the holographic information storage medium 300 from an optical path of the reproduction light L5 emitted from the first light source 110 to the holographic information storage medium 300.

The first and second mirrors 135 and 140 are examples of an optical path converter and cause the split optical paths of the reference light L11 and the signal light L12 cross each other.

The first and second focus controlling units 130 and 145 are respectively located on the optical path of the reference light L11 and the optical path of the signal light L12. The first focus controlling unit 130 forms a focal point (F of FIG. 3) of the reference light L11 at a different location in a depth direction of the holographic information storage medium 300 by changing a focal point of the objective lens 190 for the reference light L11. Likewise, the second focus controlling unit 145 forms a focal point of the signal light L12 at a different location in the depth direction of the holographic information storage medium 300 by changing a focal point of the objective lens 190 for the signal light L12. In this case, since the signal light L12 is focused on the same position as the focal point F of the reference light L11 after being reflected from a reflection layer (340 in FIG. 2) in the holographic information storage medium 300, a focal distance of the objective lens 190 for the signal light L12 is longer than that for the reference light L11. That is, the first and second focus controlling units 130 and 145 can control a numerical aperture and a focal distance of the optical system with the objective lens 190 by controlling a convergence or a divergence of the reference light L11 and the signal light L12. As described above, when the reference light L11 and the signal light L12 are focused on different locations in the depth direction of the holographic information storage medium 300, a plurality of information planes in which information is recorded can be formed.

The first focus controlling unit 130 may employ an active relay lens unit. The active relay lens unit includes, for example, a plurality of lenses 131 and 132, wherein at least one lens 131 is movable in an optical axis direction and driven by a driving unit (not shown). Likewise, the second focus controlling unit 145 may employ an active relay lens unit including a plurality of lenses 146 and 147.

The first and second polarization converters 150 and 165, the first and second polarization beam splitters 155 and 175, the wavelength selective beam splitter 160, and the third mirror 170 are included in a second optical path guiding unit. The first polarization converter 150 polarization-converts an incident light in an orthogonal polarization direction and may employ a half-wave plate. The first polarization converter 150 may be located on the optical path of the reference light L11 or the signal light L12 between the third polarization beam splitter 125 and the first polarization beam splitter 155. In the current embodiment, the first polarization converter 150 is located on the optical path of the signal light L12 between the third polarization beam splitter 125 and the first polarization beam splitter 155. Since the signal light L12 split by the third polarization beam splitter 125 has an S-polarization, the signal light L12 is converted to a P-polarization by the first polarization converter 150. That is, the reference light L11 and the signal light L12 incident to the first polarization beam splitter 155 have the same linear polarization component. When a half-wave plate is used as the first polarization converter 150, the conversion between the P-polarized light and the S-polarized light may be performed by maintaining 45° between a linear polarization direction of the incident light and a fast axis of the half-wave plate.

The first polarization beam splitter 155, for example, transmits P-polarized light as is and reflects S-polarized light. Accordingly, the first polarization beam splitter 155 transmits the reference light L11 and the signal light L12 incident from the first optical path guiding unit as they are. However, as described later, the signal light L2 reflected from the holographic information storage medium 300 in the recording mode or the reproduction light L6 reflected in the reproduction mode is reflected from the first polarization beam splitter 155, and then proceeds backward along the optical path of the signal light L12 to the third polarization beam splitter 125 by passing backward along the optical path of the reference light L11.

The second polarization converter 165 may employ, for example, an active wave plate (such as an active half-wave plate). Since the second polarization converter 165 is similar to the third polarization converter 120, a configuration of the second polarization converter 165 will not be described in detail herein. The second polarization converter 165 acts as a wave plate in the recording mode and transmits light without polarization conversion in the reproduction mode. The second polarization converter 165 is located on the optical path of the signal light L12 before meeting the reference light L11 after passing through the first polarization beam splitter 155 in the recording mode and converts the polarization of the signal light L12 so that the polarization of the signal light L12 is orthogonal to the polarization of the reference light L11.

As described later, in order to detect a portion of the signal light L2 reflected from the holographic information storage medium 300, the second polarization converter 165 may leave a portion of one linear polarized light without completely converting the portion to the other orthogonal linear polarized light in the recording mode. That is, when S-polarized light is incident in the recording mode, the second polarization converter 165 may leave a portion of the S-polarization component while converting the rest of the light from the S-polarization component to a P-polarization component. When an active half-wave plate is used as the second polarization converter 165, if an angle between a linear polarization direction of incident light and a fast axis of the active half-wave plate is, for example, 28.5°, the polarization direction of the incident light (e.g., S-polarized light) is rotated when the S-polarized light passes through the active half-wave plate. Thus, the S-polarized light is converted to light having a dominant P-polarization component and a minor S-polarization component.

The wavelength selective beam splitter 160 is a dichroic mirror acting as a simple mirror for a wavelength of the first light source 110 (i.e., the light L1 for recording and reproduction) and simply transmitting a wavelength of the second light source 210 described later (i.e., the servo light L3). The wavelength selective beam splitter 160 can perform a function of combining optical paths of the reference light L11 and the servo light L3, which will be described later.

The wavelength selective beam splitter 160 and the third mirror 170 refract an optical path so that the reference light L11 and the signal light L12 passing through the first polarization beam splitter 155 by crossing each other meet each other again.

The second polarization beam splitter 175 acts as a polarization beam splitter for wavelengths of the reference light L11 and the signal light L12 and transmits wavelengths of the servo lights L3 and L4. That is, the second polarization beam splitter 175 is a wavelength selective optical device. Thus, optical paths of the reference light L11 and the signal light L12 met by the second polarization beam splitter 175 are combined to one and directed to the objective lens 190 and, as described later, the servo lights L3 and L4 are transmitted without changing their optical paths.

Since the first and second polarization converters 150 and 165, the first and second polarization beam splitters 155 and 175, the wavelength selective beam splitter 160, and the third mirror 170 (which are included the second optical path guiding unit) are optical devices having high optical efficiency, the holographic information recording and/or reproducing apparatus according to aspects of the present invention can record and/or reproduce information with high optical efficiency as compared to a conventional holographic information recording and/or reproducing apparatus using simple beam splitters and half mirrors.

The fourth mirror 180 refracts an optical path so that the reference light L11 and the signal light L12 combined by the second polarization beam splitter 175 are directed to the objective lens 190.

The quarter-wave plate 185 changes a polarization direction of light incident to the holographic information storage medium 300 and a polarization direction of light reflected from the holographic information storage medium 300 for the servo lights L3 and L4 and the reproduction lights L5 and L6. That is, the quarter-wave plate 185 is a dual-wavelength quarter-wave plate acting as a wave plate for both the first light source 110 and the second light source 210. The reproduction light L6 reflected by the quarter-wave plate 185 is separated from the light L1 for recording and reproduction by the third polarization beam splitter 125 and can be detected by the first optical detector 200. The reflected servo light L4 is separated by the servo light polarization beam splitter 220 and can be detected by the second optical detector 240. However, the signal light L2 reflected from the holographic information storage medium 300 in the recording mode has the same polarization direction as that of the incident signal light L12.

Thus, the reflected signal light L2 can be detected by the first optical detector 200 by passing through the same optical path as that of the reproduction light L6 reflected by the second optical path guiding unit.

The objective lens 190 is a lens to concentrate the reference light L11 and the signal light L12, the reproduction light L5, or the servo light L3 on a predetermined area of the holographic information storage medium 300. The objective lens 190 can change focal points of the reference light L11 and the signal light L12 on the holographic information storage medium 300 with the first and second focus controlling units 130 and 145 and may change a numerical aperture of the optical system. The objective lens 190 causes the reference light L11 and the signal light L12 to be incident to the holographic information storage medium 300, whereby the reference light L11 is focused on the focal point (F of FIG. 3) in the holographic information storage medium 300 and the signal light L12 is reflected from the reflection layer (340 of FIG. 2) in the holographic information storage medium 300 and focused on the same position as the focal point F of the reference light L11. Furthermore, as described later, the servo light L3 is concentrated on a servo layer (320 of FIG. 6) in the holographic information storage medium 300.

The first optical detector 200 detects the signal light L2 or the reproduction light L6 reflected from the holographic information storage medium 300. The concentration lens 195 to concentrate the reflected signal light L2 or the reflected reproduction light L6 may further be included between the third polarization beam splitter 125 and the first optical detector 200.

The servo optical system will now be described. According to aspects of the present invention, the holographic information storage medium used in the holographic information recording and/or reproducing apparatus includes the servo layer (320 of FIG. 2), and the optical pickup 100 includes the optical system for reading servo information recorded in the servo layer 320.

The second light source 210 emits the servo light L3 and may employ, for example, a semiconductor laser diode emitting a red light. The second light source 210 may emit one-directional linear polarized light L in order to split the servo light L3 incident to the holographic information storage medium 300 and the servo light L4 reflected from the holographic information storage medium 300 according to the respective polarization directions in the servo light polarization beam splitter 220. The diffraction grating 215 is an optical member diffracting the servo light L3 emitted by the second light source 210 to $0^{th}$-order diffraction light and $+1^{st}$- or $-1^{st}$-order diffraction light and is used to detect a servo error signal using a push-pull method. The second collimating lens 225 regulates the servo light L3 emitted by the second light source 210 to a parallel light. The servo light polarization beam splitter 220 may employ, for example, a polarization beam splitter that splits the servo light L3 incident to the holographic information storage medium 300 and the servo light L4 reflected from the holographic information storage medium 300 according to their respective polarization directions. The servo light focus controlling unit 230 varies a focal point of the servo light L3 in the holographic information storage medium 300 in the depth direction and may employ a relay lens unit including a plurality of lenses 231 and 232, wherein at least one lens 231 is movably assembled in an optical axis direction and driven by a driving unit (not shown). The detection lens 235 makes an optical spot of the reflected servo light L4 properly formed on the second optical detector 240 and may employ, for example, an astigmatic lens so that a focus error signal can be detected by astigmatism. The second optical detector 240 includes a plurality of optical detecting units and detects servo information and a servo error signal included in the servo layer (320 of FIG. 2) of the holographic information storage medium 300. The servo optical system described above is an example of using servo light having a wavelength different from that of the light for recording and reproduction, and it is understood that aspects of the present invention are not limited thereto.

Figure 2:
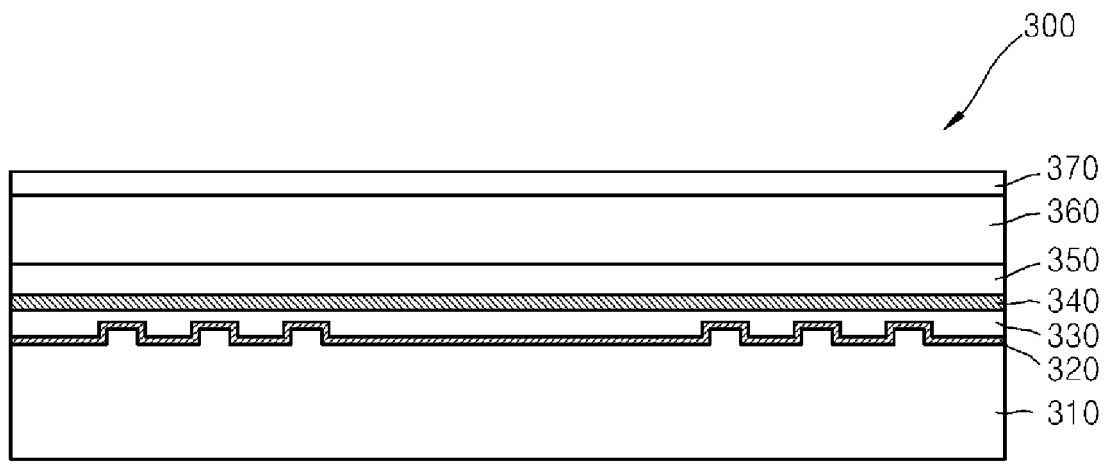
FIG. 2 illustrates a reflective holographic information storage medium loaded in the holographic information recording and/or reproducing apparatus illustrated in FIG. 1.

FIG. 2 illustrates a reflective holographic information storage medium 300 loaded in the holographic information recording and/or reproducing apparatus illustrated in FIG. 1. Referring to FIG. 2, the holographic information storage medium 300 used in the holographic information recording and/or reproducing apparatus is a reflective storage medium having a structure in which a substrate 310, a servo layer 320, a buffer layer 330, a reflection layer 340, a space layer 350, a recording layer 360, and a cover layer 370 are sequentially layered.

The servo layer 320 is a layer in which servo information is recorded and reflects servo light (L3 of FIG. 1). The buffer layer 330 may be formed with a transparent material or a material absorbing a wavelength of light for recording and reproduction. Although the servo layer 320 is located below the reflection layer 340 in FIG. 2, it is understood that aspects of the present invention are not limited thereto. As described later with reference to FIG. 9, the servo layer 320 may be above or in the recording layer 360.

The reflection layer 340 reflects the signal light L1 so that the signal light L1 concentrates on the focal point (F of FIG. 3) in the holographic information storage medium 300. In the current embodiment, the reflection layer 340 employs a circular polarized-light split reflection layer formed with a material reflecting light having first circular polarization and transmitting light having second circular polarization, wherein the first circular polarization direction is orthogonal to the second circular polarization direction. The circular polarized-light split reflection layer may be formed with, for example, a cholesteric liquid crystal of a liquid crystal film in a liquid crystal state or a hardened state. The cholesteric liquid crystal has a structure whereby directors of liquid crystal molecules are twisted in a spiral pattern, and can split the signal light L1 to two orthogonal circular polarized lights by reflecting circular polarized light corresponding the spiral pattern and transmitting circular polarized light corresponding an inverse direction to the spiral pattern, wherein the reflected light is maintained in an original circular polarization state. Furthermore, the reflection layer 340 is designed to transmit the servo light L3, and to transmit the reference light L3 in order to reduce noise.

The space layer 350 is a layer to secure a space between the recording layer 360 and the reflection layer 340. The space layer 350 may be used to remove noise due to partial light defocused and reflected by the reflection layer 340. The recording layer 360 is formed with a photosensitive material (e.g., a photo polymer or a thermoplastic material) of which a refractive index varies when light is absorbed. The cover layer 370 is a layer to protect the recording layer 360 from the outside.

A recording and/or reproducing method of the holographic information recording and/or reproducing apparatus according to an embodiment of the present invention will now be described with reference to FIGS. 3 through 7.

Figure 3:
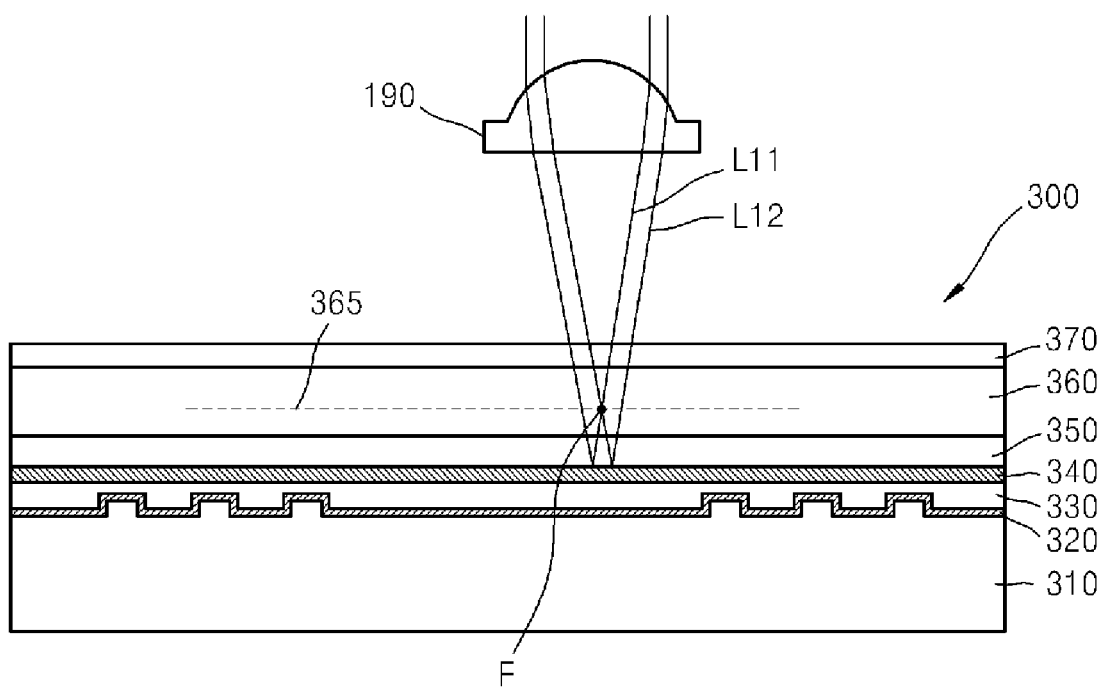
FIG. 3 is a schematic optical configuration for illuminating a signal light and a reference light onto the holographic information storage medium illustrated in FIG. 2 when a numerical aperture for the signal light is the same as that for the reference light.

The recording mode of the holographic information recording and/or reproducing apparatus will be described first. FIG. 3 is a schematic optical configuration for illuminating the signal light L12 and the reference light L11 onto the holographic information storage medium 300 illustrated in FIG. 2 in the recording mode. Since each layer of the holographic information storage medium 300 illustrated in FIG. 3 is similar to those illustrated in FIG. 2, a detailed description will be omitted herein.

Referring to FIG. 3, the reference light L11 and the signal light L12 respectively having P- and S-polarization components are illuminated onto the holographic information storage medium 300 by the objective lens 190 after moving along the same optical path. In this case, convergence and divergence are controlled by the first and second optical path guiding units. In particular, the first and second focus controlling units 130 and 145 guide the reference light L11 and the signal light L12, wherein the reference light L11 is concentrated on the focal point F in the recording layer 360 right after passing through the cover layer 370 and the signal light L12 is concentrated on the focal point F in the recording layer 360 after passing through the cover layer 370 and the recording layer 360 and being reflected from the reflection layer 340.

Accordingly, since optical spots of the reference light L11 and the signal light L12 meet each other on the focal point F, bulk-type interference fringes are formed around the focal point F. Since a pattern of these interference fringes varies according to a modulated state of the signal light L12 or a modulated state of the reference light L11 and the signal light L12, information can be recorded according to the interference fringes. The interference fringes can form a single information plane 365 in the recording layer 360 by being recorded along tracks on the same side, or information can be recorded in a plurality of planes by forming interference fringes while a focal point is changed in the depth direction of the recording layer 360. The holographic information storage medium 300 may use a micro holography method in which single-bit information is contained in an interference pattern for every focal point F, though it is understood that aspects of the present invention are not limited thereto. For example, the holographic information storage medium 300 may use a volume holography method in which a plurality of pieces of information are simultaneously recorded by stereoscopic interference fringes formed due to overlapping of the optical spots of the reference light L11 and the signal light L12.

The description of the reference light L11 and the signal light L12 with reference to FIG. 3 is for a case where a numerical aperture for the signal light L12 is the same as that for the reference light L11. However, it is understood that aspects of the present invention are not limited thereto. As described above, a numerical aperture of the optical system may be controlled by using the first and second focus controlling units 130 and 145 and the objective lens 190. Accordingly, a numerical aperture of the objective lens 190 for the reference light L11 may be different from that for the signal light L12 according to other aspects.

Figure 4:
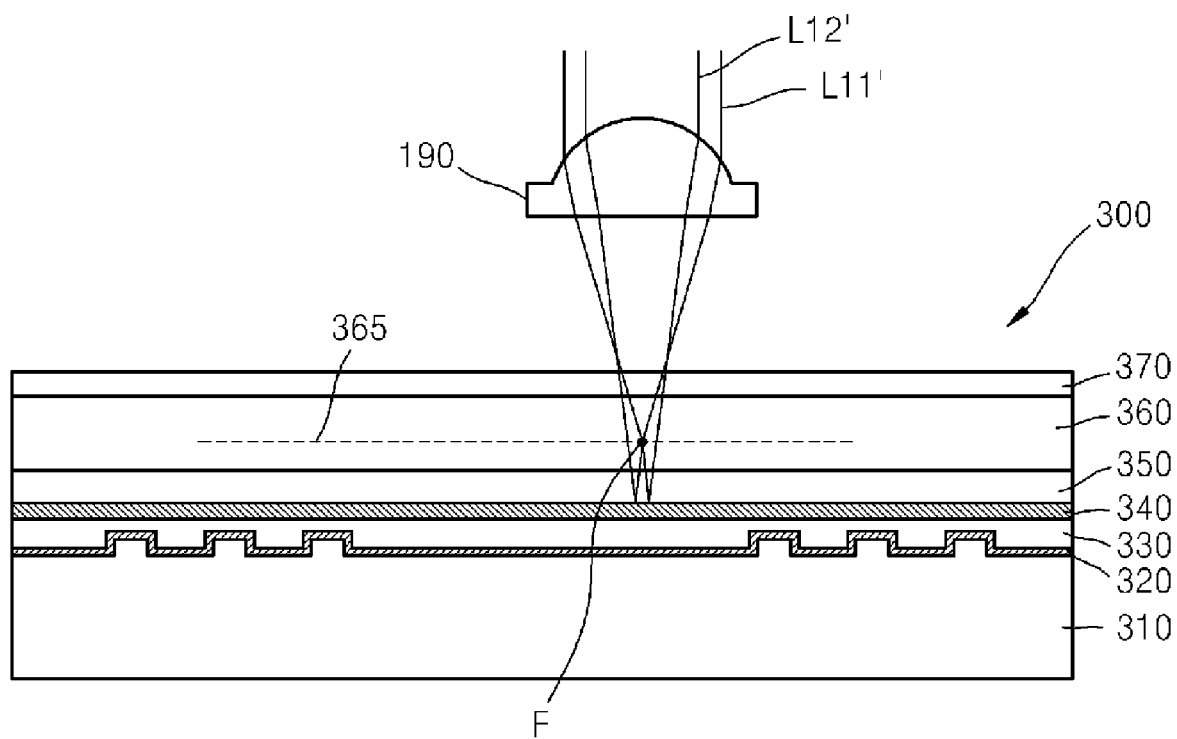
FIG. 4 is a schematic optical configuration for illuminating a signal light and a reference light onto the holographic information storage medium illustrated in FIG. 2 when the numerical aperture for the signal light is different from that for the reference light.

FIG. 4 is a schematic optical configuration for illuminating the signal light L12 and the reference light L11 onto the holographic information storage medium 300 illustrated in FIG. 2 when the numerical aperture for the signal light L12 is smaller than that for the reference light L11. Since reference numerals in FIG. 4 are the same as those in FIG. 3, a detailed description of components in FIG. 4 is omitted herein.

Referring to FIG. 4, since a numerical aperture of the objective lens 190 for the signal light L12 is relatively smaller, a focal distance of the signal light L12 is relatively longer in a case of the same beam width. Thus, an optical spot of the signal light L12 is formed on the focal point F after the signal light L12 is reflected from the reflection layer 340. However, since a numerical aperture of the objective lens 190 for the reference light L11 is relatively larger, a focal distance of the reference light L11 is relatively shorter in a case of the same beam width. Thus, an optical spot of the reference light L11 is directly formed on the focal point F.

By forming an optical configuration as described above, an optical system having a smaller numerical aperture for at least the signal light L12 can be achieved. Thus, a margin can be obtained in a case of aberration allowed in a design of optical devices or assembling tolerance in a manufacturing process of optical pickups.

Figure 5:
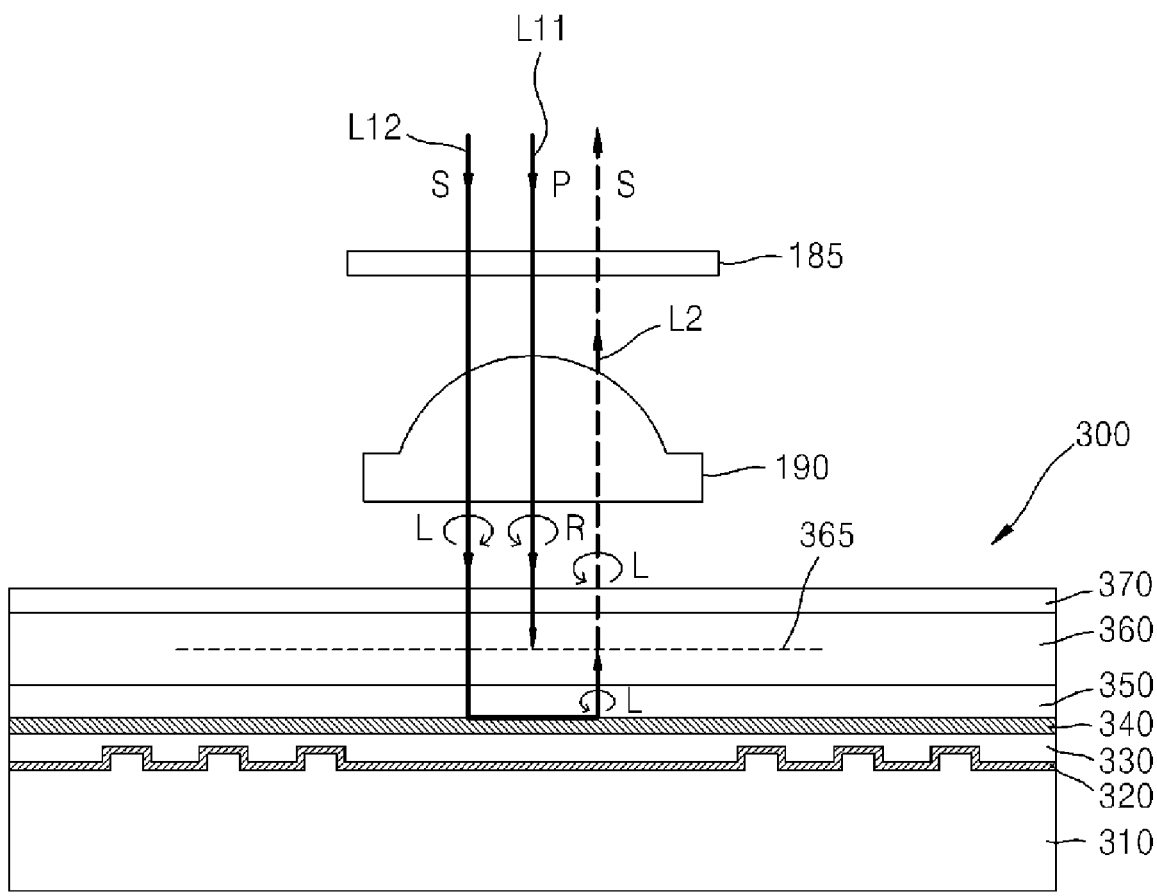
FIG. 5 illustrates polarization states of a signal light and a reference light illuminated onto the holographic information storage medium illustrated in FIG. 2 in a recording mode.

FIG. 5 illustrates polarization states of the signal light L12 and the reference light L11 illuminated onto the holographic information storage medium illustrated 300 in FIG. 2. Referring to FIG. 5, the reference light L11 and the signal light L12, each having a different linear polarization component, are incident to the quarter-wave plate 185. For example, the reference light L11 is incident to the quarter-wave plate 185 in a P-polarization state, and the signal light L12 is incident to the quarter-wave plate 185 in an S-polarization state. The quarter-wave plate 185 is an optical member converting linear polarized light to circular polarized light and circular polarized light to linear polarized light. In terms of the polarization states, the polarization of the signal light L12 is converted to a left circular polarization L after passing through the quarter-wave plate 185, and the polarization of the reference light L11 is converted to a right circular polarization R after passing through the quarter-wave plate 185. The signal light L12 that has the left circular polarization L maintains its original polarization state by being reflected from the reflection layer 340 as is. The reflected signal light L2 having the left circular polarization L is focused in the information plane 365. However, the reference light L11 having the right circular polarization R is directly focused on the information plane 365 right after passing through the cover layer 370. Since the reflected signal light L2 and the reference light L11 meeting in the information plane 365 move in opposite directions and have opposite circular polarization directions, an electric field vector of the reflected signal light L2 rotates in the same direction as that of an electric field vector of the reference light L11, and thus, interference occurs in the information plane 365. This interference causes information to be recorded on the recording layer 360 that is made of a photosensitive material.

The signal light L2 reflected from the reflection layer 340 forms interference fringes at the focal point F and continues to an outside of the holographic information storage medium 300 via the cover layer 370. Since the reflected signal light L2 maintains the left circular polarization state L, the reflected signal light L2 is converted to an S-polarized light after passing through the quarter-wave plate 185.

Referring back to FIG. 1, the reflected signal light L2 that is S-polarized light is reflected from the second polarization beam splitter 175 and passes through the second polarization converter 165. Since the second polarization converter 165 is active in the recording mode, the reflected signal light L2 is polarization converted. As described above, when S-polarized light is incident to the second polarization converter 165 in the recording mode, the second polarization converter 165 leaves a portion of an S-polarization component unconverted while converting the remainder of the S-polarization component to a P-polarization component. The reflected signal light L2 having the portion of the S-polarization component is reflected from the first polarization beam splitter 155 and moves backward along the optical path of the reference light L11. That is, the signal light L2 having the S-polarization component, which has been reflected from the first polarization beam splitter 155, is incident to the third polarization beam splitter 125 after passing through the first mirror 135 and the first focus controlling unit 130. In the current embodiment, since the third polarization beam splitter 125 reflects S-polarized light, the signal light L2 moving backward along the optical path of the reference light L11 and being incident to the third polarization beam splitter 125 is reflected from the third polarization beam splitter 125 to continue to the first optical detector 200.

As described above, information on the signal light L2 detected by the first optical detector 200 in the recording mode may be used for a focus servo so that the reference light L11 and the signal light L12 are focused on the information plane 365 in the holographic information storage medium 300 by controlling the first and second focus controlling units 130 and 145.

Figure 6:
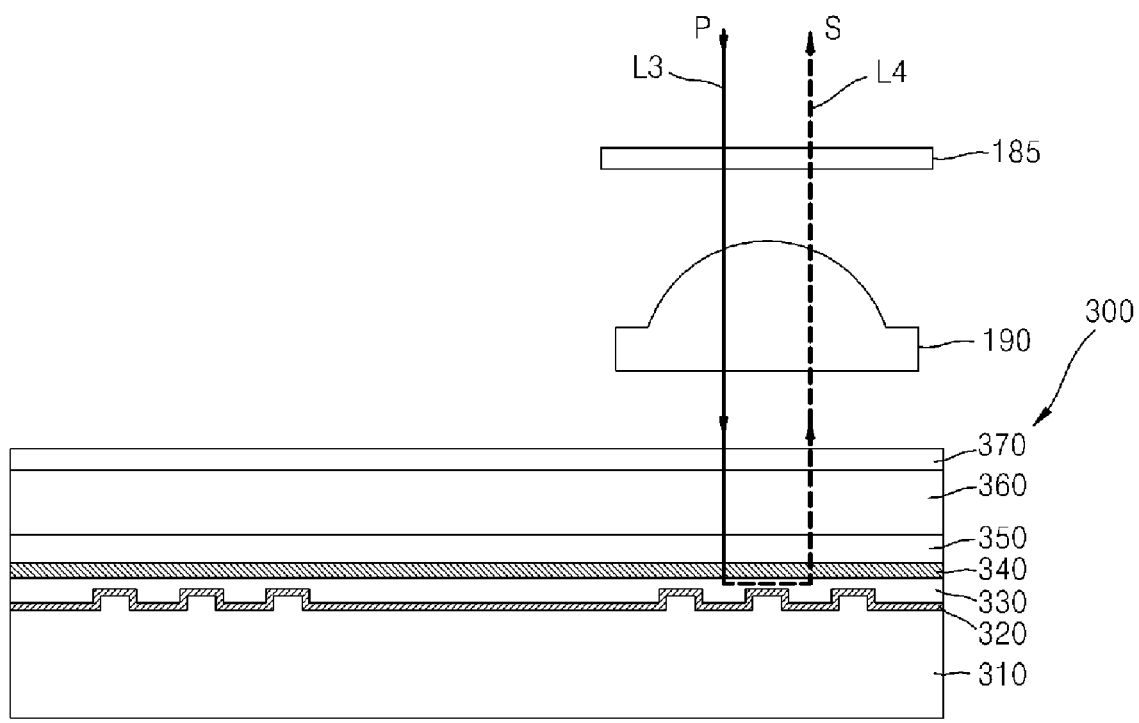
FIG. 6 illustrates a servo light illuminated onto the holographic information storage medium illustrated in FIG. 2 in a servo process.

Servo information detection of the holographic information recording and/or reproducing apparatus according to current embodiment will now be described with reference to FIG. 6. FIG. 6 illustrates a servo light illuminated onto and reflected from the holographic information storage medium 300 illustrated in FIG. 2. Since each layer of the holographic information storage medium 300 illustrated in FIG. 6 is similar to those illustrated in FIG. 2, a detailed description will be omitted herein.

Referring to FIG. 6, one-directional linear polarized light (e.g., the servo light L3 that is P-polarized light) is incident to the holographic information storage medium 300 via the quarter-wave plate 185 and the objective lens 190. The servo light L3 is converted from the P-polarized light to the left circular polarized light while passing through the quarter-wave plate 185. The servo light L3 incident to the holographic information storage medium 300 is reflected from the servo layer 320. In this case, since a rotation direction of a polarization vector of the servo light L3 is not changed but an orientation of light is changed in an opposite direction, the left circular polarized light is converted to a right circular polarized light. The reflected servo light L4 is converted to an S-polarized light while passing through the quarter-wave plate 185 and moves backward along the optical path of the incident servo light L3. Referring back to FIG. 1, the reflected servo light L4 passes through the second polarization beam splitter 175 and the wavelength selective beam splitter 160 without changing an optical path, is reflected from the servo light polarization beam splitter 220 after passing through the servo light focus controlling unit 230 and the second collimating lens 225, and is detected by the second optical detector 240. Since information regarding tracks is contained in the servo layer 320 of the holographic information storage medium 300, tracking of recording marks recorded with bulk-type interference fringes can be performed by reading servo information contained in the servo layer 320.

Figure 7:
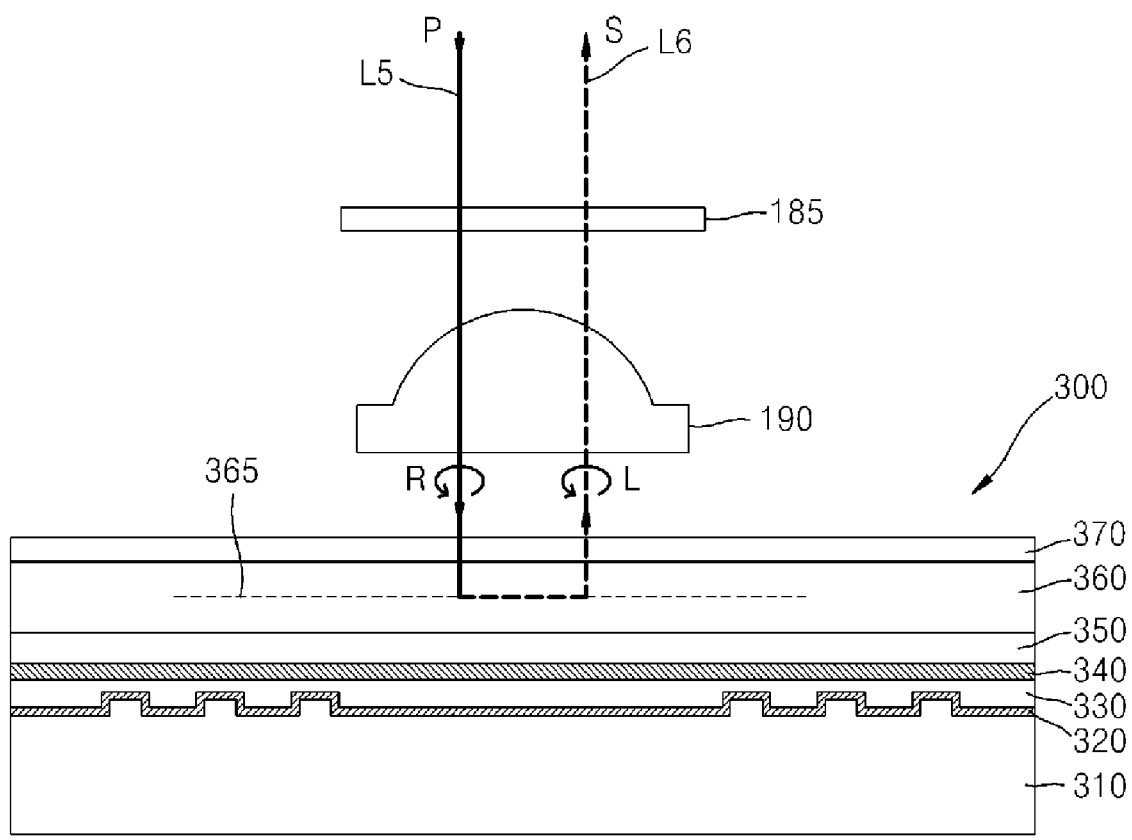
FIG. 7 illustrates a polarization state of a reproduction light illuminated onto the holographic information storage medium illustrated in FIG. 2 in a reproduction mode.

The reproduction mode of the holographic information recording and/or reproducing apparatus according will now be described with reference to FIG. 7. FIG. 7 illustrates a polarization state of reproduction light illuminated onto the holographic information storage medium 300 illustrated in FIG. 2.

Referring to FIG. 7, the reproduction light L5 having the same polarization direction as that of the reference light L11 is illuminated onto the holographic information storage medium 300 for reproduction. In this case, since the third polarization converter 120 does not perform the polarization conversion operation, the reproduction light L5 is guided to the holographic information storage medium 300 with the same polarization direction as that of the reference light L11 (e.g., a P-polarization direction). A focal point of the reproduction light L5 can be formed in the desired information plane 365 of the holographic information storage medium 300 by using the first focus controlling unit 130 located on the optical path of the reproduction light L5. The reproduction light L5 that is P-polarized light is converted to a right circular polarized light R by the quarter-wave plate 185 and is incident to the holographic information storage medium 300 via the objective lens 190. The reproduction light L5 focused on the information plane 365 is reflected from the information plane 365 with information included in interference fringes formed on the information plane 365. That is, the reproduction light L5 incident in the right circular polarization state is diffracted (i.e., reflected) from the information plane 365 on which information is recorded. Since an orientation of the reproduction light L6 reflected from the information plane 365 is changed but a rotation direction of an electric field vector is not changed, the reflected reproduction light L6 becomes in the left circular polarization state. The reflected reproduction light L6 that is left circular polarized light L is converted to S-polarized light by the quarter-wave plate 185 and moves backward along the optical path of the incident reproduction light L5. As described above, the reflected reproduction light L6 is reflected from the third polarization beam splitter 125 and detected by the first optical detector 200.

Figure 8:
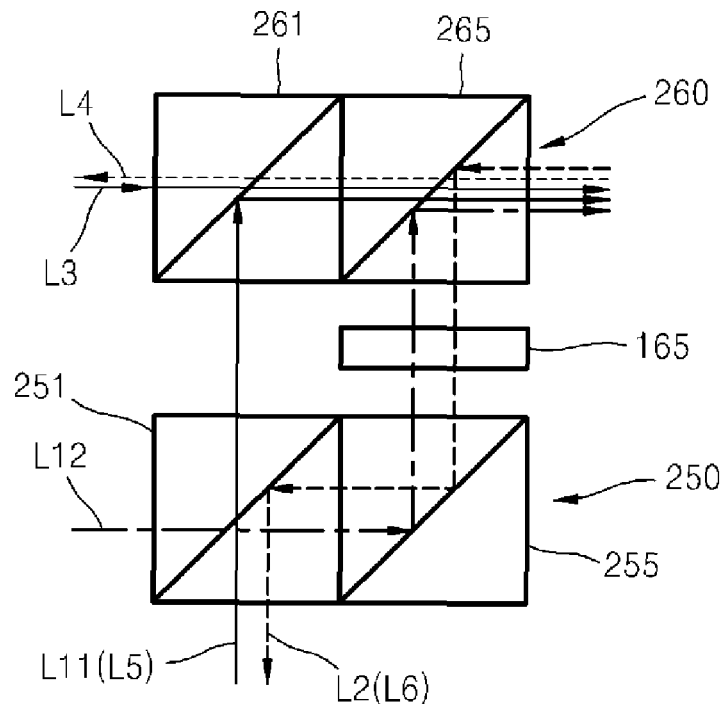
FIGS. 8 and 9 illustrate a portion of a second optical path guiding unit being formed in one body, which is included in the holographic information recording and/or reproducing apparatus illustrated in FIG. 1.

FIG. 8 is an example obtained by modifying the second optical path guiding unit according the embodiment described above and illustrates a configuration in which optical devices included in an area A of the holographic information recording and/or reproducing apparatus illustrated in FIG. 1 are combined into one body. Referring to FIG. 8, first and second polarization beam splitters 251 and 265 and a wavelength selective beam splitter 261 are cubic beam splitters, and a third mirror 255 may include a cubic prism. The first polarization beam splitter 251 and the third mirror 255 are included in a first optical device 250 by being combined into one body. Similarly, the second polarization beam splitter 265 and the wavelength selective beam splitter 261 are included in a second optical device 260 by being combined into one body. The second polarization converter 165 may be located between the third mirror 255 and the second polarization beam splitter 265.

Figure 9:
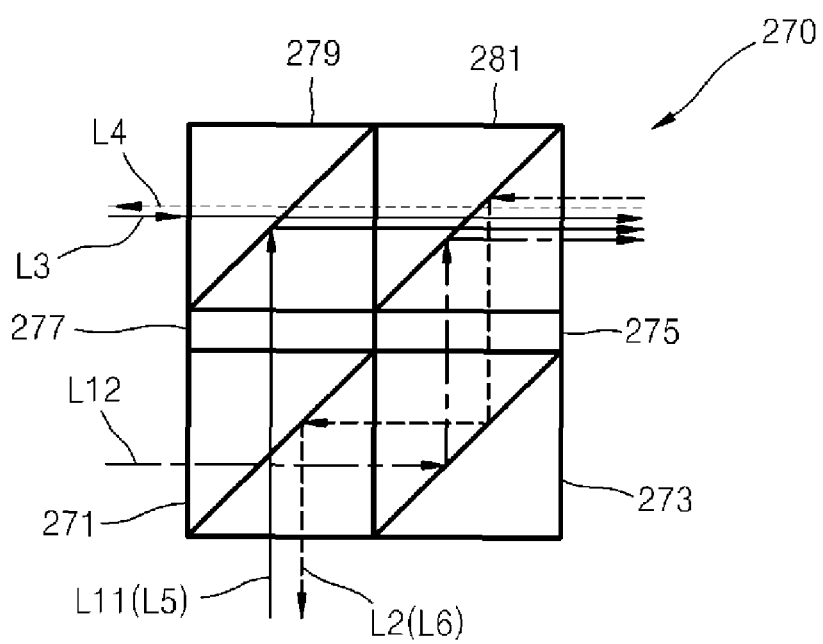

FIG. 9 is another example of the second optical path guiding unit according to the embodiment described above and illustrates an optical device 270 obtained by combining the optical devices included in the area A of the holographic information recording and/or reproducing apparatus illustrated in FIG. 1 into one body. First and second polarization beam splitters 271 and 281 and a wavelength selective beam splitter 279 are cubic beam splitters, and a third mirror 273 may include a cubic prism. A second polarization converter 275 is an active half-wave plate and may be located between the third mirror 273 and the second polarization beam splitter 281. By locating a transparent plate 277 having a same thickness as that of the second polarization converter 275 between the first polarization beam splitter 271 and the wavelength selective beam splitter 279, a thickness difference due to the second polarization converter 275 between the third mirror 273 and the second polarization beam splitter 281 can be compensated for.

The modifications described with reference to FIGS. 8 and 9 are only examples, and other various modifications can be provided according to other aspects of the present invention. For example, referring back to FIG. 1, the first polarization beam splitter 155 and the wavelength selective beam splitter 160 may be combined into one body, and/or the third mirror 170 and the second polarization beam splitter 175 may be combined into one body. Such an optical configuration whereby components are combined into one body may reduce an installation space of optical parts. In FIGS. 8 and 9, optical paths of the reference light L11, the signal lights L12 and L2, the servo lights L3 and L4, and the reproduction lights L5 and L6 are the same as those described with reference to FIG. 1.

Figure 10:
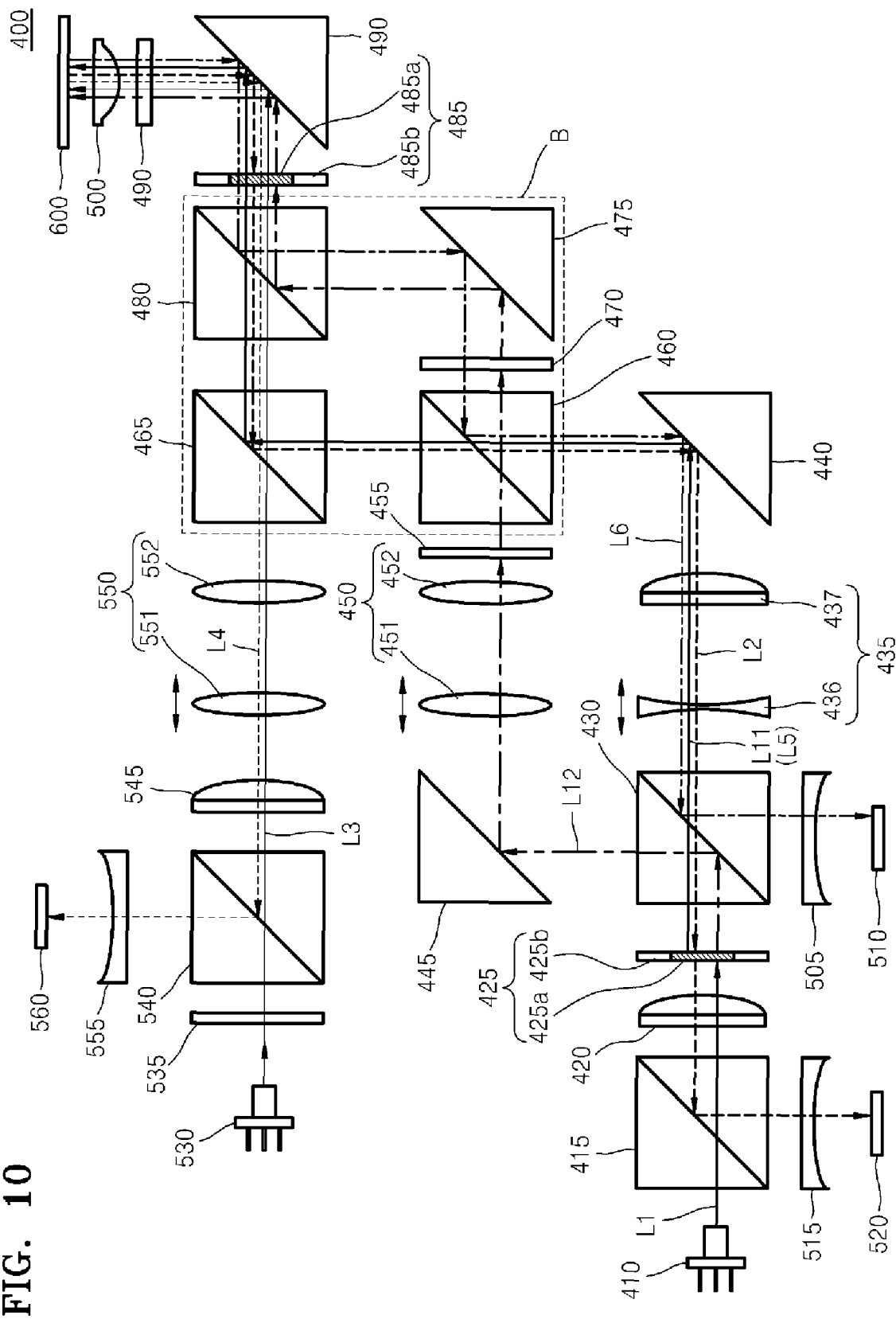
FIG. 10 is a schematic optical configuration of a holographic information recording and/or reproducing apparatus according to another embodiment of the present invention.

FIG. 10 is a schematic optical configuration of a holographic information recording and/or reproducing apparatus according to another embodiment of the present invention. Referring to FIG. 10, the holographic information recording and/or reproducing apparatus records information on a holographic information storage medium 600 and reproduces recorded information. Furthermore, the holographic recording and/or reproducing apparatus includes a circuit (not shown) and an optical pickup 400 illuminating light onto a single side of the holographic information storage medium 600 and receiving the illuminated light. The optical pickup 400 includes a first light source 410, a fourth polarization beam splitter 415, a first collimating lens 420, a third polarization converter 425, a third polarization beam splitter 430, first and second focus controlling units 435 and 450, first and second mirrors 440 and 445, first and second polarization converters 455 and 470, first and second polarization beam splitters 460 and 480, a wavelength selective beam splitter 465, a third mirror 475, a fourth polarization converter 485, a fourth mirror 490, a quarter-wave plate 495, an objective lens 500, first and second optical detectors 510 and 520, a concentration lens 505, and a first detection lens 515. In order to read servo information, the optical pickup 400 may further include a servo optical system including a second light source 530, a diffraction grating 535, a servo light polarization beam splitter 540, a second collimating lens 545, a servo light focus controlling unit 550, a second detection lens 555, and a third optical detector 560.

In FIG. 10, a thick solid line indicates a reference light L11 or a reproduction light L5 emitted from the first light source 410 to the holographic information storage medium 600, a thick alternate long and short dash line indicates a signal light L12 emitted from the first light source 410 to the holographic information storage medium 600, a thick dotted line indicates a reflected signal light L2 reflected from the holographic information storage medium 600 to the second optical detector 520, a thick alternate long-short-short dash line indicates a reflected reproduction light L6 reflected from the holographic information storage medium 600 to the first optical detector 510, a thin solid line indicates a servo light L3 emitted from the second light source 530 to the holographic information storage medium 600, and a thin dotted line indicates a reflected servo light L4 reflected from the holographic information storage medium 600 to the third optical detector 560.

Optical members according to the current embodiment, which are similar to those of the holographic information recording and/or reproducing apparatus described with reference to FIG. 1, will be described in lesser detail than above with reference to FIG. 1.

The first light source 410, the fourth polarization beam splitter 415, the first collimating lens 420, and the third polarization converter 425 are included in a first light source unit emitting the reference light L11 and the signal light L12 in the recording mode and emitting the reproduction light L5 in the reproduction mode.

The first light source 410 emits a light L1 for recording and reproduction that has a modulated one-directional linear polarization in the recording mode and a non-modulated one-directional linear polarization in the reproduction mode according to information to be recorded. For example, the first light source 410 may employ a semiconductor laser diode emitting a blue light.

The fourth polarization beam splitter 415 transmits the light L1 having the one-directional linear polarization as is and reflects light having a linear polarization orthogonal to the polarization of the light L1. As described later, since the polarization of the signal light L2 reflected from the holographic information storage medium 600 in the recording mode is orthogonal to the polarization of the light L1 for recording and reproduction on the same optical path, the reflected signal light L2 is reflected to the second optical detector 520. For example, when the first light source 410 emits the light L1 for recording and reproduction that is P-polarized light, the signal light L2 reflected from the holographic information storage medium 600 has an S-polarization. Thus, the reflected signal light L2 is reflected from the fourth polarization beam splitter 415 to the second optical detector 520.

An optical emitting surface of the third polarization converter 425 is divided into a first polarization conversion area 425a in a center thereof and a first transparent area 425b surrounding the center. The first polarization conversion area 425a polarization-converts P-polarized light emitted by the first light source 410 to S-polarized light in the recording mode, and passes the P-polarized light emitted by the first light source 410 without polarization conversion in the reproduction mode. The first transparent area 425b passes the P-polarized light emitted by the first light source 410 without polarization conversion regardless of the recording mode or the reproduction mode. Thus, the light L1 for recording and reproduction is divided into the signal light L12 polarization-converted by passing through the polarization conversion area 425a and the reference light L11 passing through the first transparent area 425b without polarization conversion when the light L1 for recording and reproduction passes through the third polarization converter 425. Although the reference light L11 appears to pass through the polarization conversion area 425a in FIG. 10, this is only for convenience of drawing and does not indicate that the reference light L11 passes through the polarization conversion area 425a.

Although the polarization conversion area 425a is in the center and the first transparent area 425b is in the surrounding area in the current embodiment, it is understood that aspects of the present invention are not limited thereto. That is, according to other aspects, the polarization conversion area 425a is in the surrounding area and the first transparent area 425b is in the center.

The third polarization beam splitter 430, the first and second focus controlling units 435 and 450, and the first and second mirrors 440 and 445 are included in a first optical path guiding unit guiding the reference light L11 and the signal light L12 so that the reference light L11 and the signal light L12 cross each other after passing through different optical paths. Since the optical devices included in the first optical path guiding unit are similar to those described with reference to FIG. 1, they will not be described herein. However, unlike that described with reference to FIG. 1, the first optical detector 510 does not detect the reflected signal light L2 because although the reflected signal light L2 is directed from the first polarization beam splitter 460 to the third polarization beam splitter 430 by moving backward along an optical path of the reference light L11, the reflected signal light L2 penetrates the third polarization beam splitter 430 since a polarization direction of the reflected signal light L2 is the same as that of the reference light L11. Polarization of the reflected signal light L2 will be described later.

The first and second polarization converters 455 and 470, the first and second polarization beam splitters 460 and 480, the wavelength selective beam splitter 465, and the third mirror 475 are included in a second optical path guiding unit. These optical devices included the second optical path guiding unit are similar to those described with reference to FIG. 1. Furthermore, like modified examples described with reference to FIGS. 8 and 9, optical parts included in the second optical path guiding unit may be combined into one body. For example, the second polarization converter 470, the first and second polarization beam splitters 460 and 480, the wavelength selective beam splitter 465, and/or the third mirror 475 may be combined into one body as a single optical part (such as the modified example described with reference to FIG. 9).

An optical path of the reflected signal light L2 or reflected reproduction light L6 is different from that described with reference to FIG. 1, and this will be described later.

The fourth polarization converter 485 is located between the second polarization beam splitter 480 and the fourth mirror 490. The fourth polarization converter 485 corresponds to the third polarization converter 425, and an optical emitting surface of the fourth polarization converter 485 is divided into a second polarization conversion area 485a in the center and a second transparent area 485b surrounding the center. The second polarization conversion area 485a polarization-converts P-polarized light to S-polarized light and S-polarized light to P-polarized light in the recording mode and passes light without polarization conversion in the reproduction mode. Since the signal light L12 passing through the center of a light flux or the reference light L11 passing through the surroundings of the light flux maintains a spatial distribution even if the light passes through the first and second optical path guiding units, the signal light L12 passes through the second polarization conversion area 485a, and the reference light L11 passes through the second transparent area 485b. In addition, the signal light L12 passing through the second polarization conversion area 485a is polarization-converted, and the reference light L11 passing through the second transparent area 485b is not polarization-converted.

As described above, the reference light L11 and the signal light L12 respectively corresponding to an extension light flux and an intension light flux are illuminated onto the holographic information storage medium 600. Although the current embodiment provides the fourth polarization converter 485 corresponding to the third polarization converter 425 such that the second polarization conversion area 485a takes the center area and the second transparent area 485b takes the surrounding area, it is understood that aspects of the present invention are not limited thereto.

The first optical detector 510 detects the reproduction light L6 reflected from the holographic information storage medium 300. The concentration lens 505 to concentrate the reflected reproduction light L6 may further be included between the third polarization beam splitter 430 and the first optical detector 510.

The second optical detector 520 detects the signal light L2 reflected from the holographic information storage medium 300. The first detection lens 515 to properly concentrate an optical spot of the reflected signal light L2 on the second optical detector 520 may further be included between the fourth polarization beam splitter 415 and the second optical detector 520.

Since each component of the servo optical system is similar to that described with reference to FIG. 1, the servo optical system will not be described herein.

Figure 11:
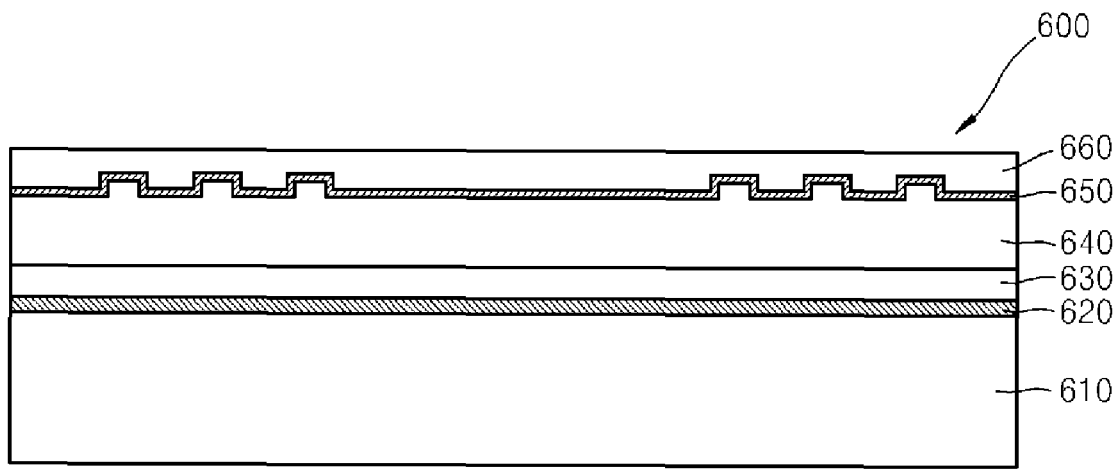
FIG. 11 illustrates a reflective holographic information storage medium equipped in the holographic information recording and/or reproducing apparatus illustrated in FIG. 10.

FIG. 11 illustrates a reflective holographic information storage medium loaded in the holographic information recording and/or reproducing apparatus illustrated in FIG. 10. Referring to FIG. 11, the holographic information storage medium 600 is a reflective storage medium and has a structure in which a substrate 610, a reflection layer 620, a space layer 630, a recording layer 640, a servo layer 650, and a cover layer 660 are sequentially layered.

The holographic information storage medium 600 according to the current embodiment has different characteristics for the reflection layer 620 and a different position of the servo layer 650 from the holographic information storage medium 300 described with reference to FIG. 2. A position of the servo layer 650 is not limited to a position above the reflection layer 620 as described with reference to FIG. 2, and may be located at another position according to other aspects.

The reflection layer 620 includes a general reflection film material. Furthermore, unlike the reflection layer 340 of the holographic information storage medium 300 illustrated in FIG. 2, when incident light as circular polarized light is reflected from the reflection layer 620, a polarization direction of the circular polarized light is changed. Polarization states in the recording mode, the servo process, and the reproduction mode will be described with reference to FIGS. 12 through 14.

Figure 12:
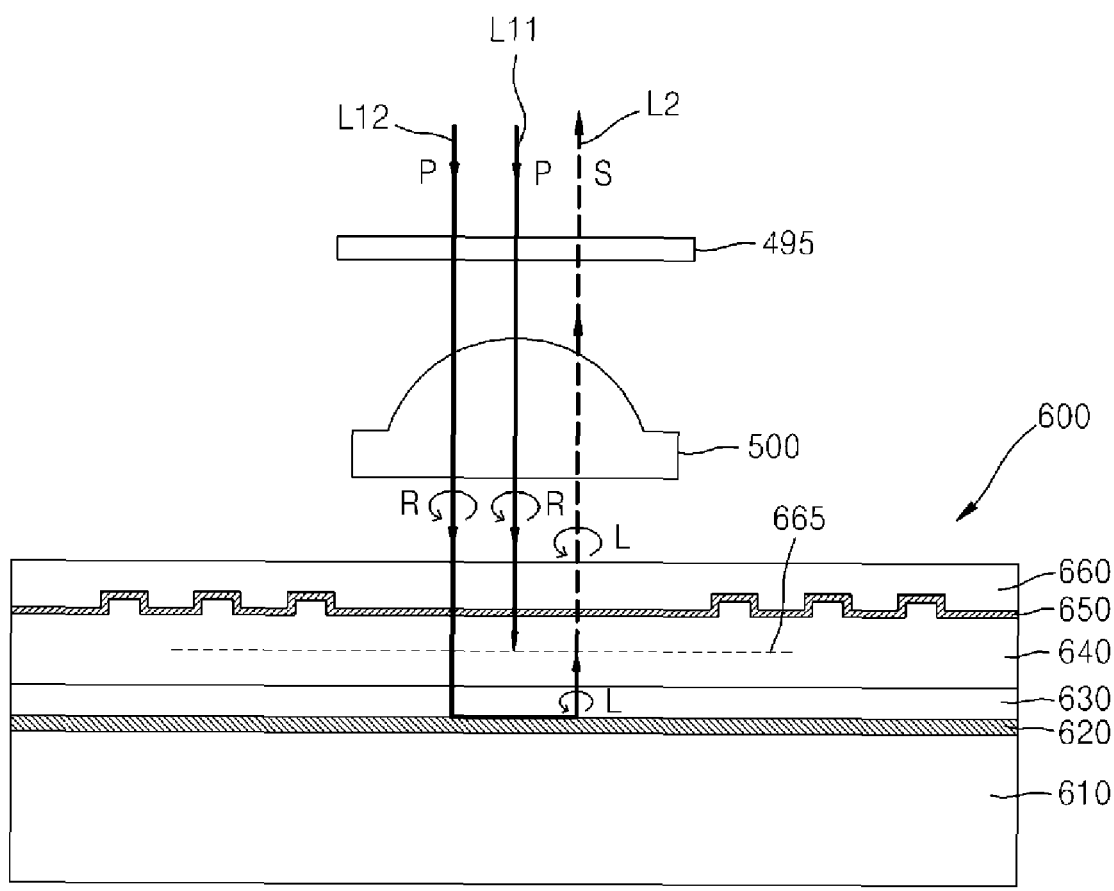
FIG. 12 illustrates polarization states of a signal light and a reference light illuminated onto the holographic information storage medium illustrated in FIG. 11 in a recording mode.

Polarization states of the signal light L12 and the reference light L11 incident to the holographic information storage medium 600 will now be described with reference to FIG. 12. Referring to FIG. 12, the reference light L11 and the signal light L12 having the same linear polarization are incident to the quarter-wave plate 495. For example, the reference light L11 and the signal light L12 are incident to the quarter-wave plate 495 in a P-polarization state. The polarization state of the reference light L11 and the signal light L12 are changed to a right circular polarization R when the reference light L11 and the signal light L12 pass through the quarter-wave plate 495.

When the signal light L12 that has the right circular polarization R is reflected from the reflection layer 620, the signal light L12 is converted to a left circular polarized light L. The reflected signal light L2 that has the left circular polarized light L is focused on an information plane 665. However, the reference light L11 that has the right circular polarized light R is directly focused on the information plane 665 right after passing through the cover layer 660. Since the reflected signal light L2 and the reference light L11 meeting in the information plane 665 move opposite directions and have opposite circular polarization directions, interference occurs in the information plane 665. This interference causes information to be recorded on the recording layer 640 that includes a photosensitive material.

The signal light L2 reflected from the reflection layer 620 forms interference fringes at the focal point F and continues to an outside of the holographic information storage medium 600 via the cover layer 660. Since the reflected signal light L2 maintains the left circular polarization state L, the reflected signal light L2 is converted to an S-polarized light after passing through the quarter-wave plate 495.

Referring back to FIG. 10, the reflected signal light L2 that is S-polarized passes through the fourth polarization converter 485. Since the reflected signal light L2 located in the center area of the light flux maintains its state even if reflected, the reflected signal light L2 is polarization-converted to a P-polarized light after passing through the second polarization conversion area 485a of the fourth polarization converter 485. Thus, the reflected signal light L2 passes through the second polarization beam splitter 480 as is and moves backward along the optical path of the reference light L11. That is, the reflected signal light L2 is incident to the fourth polarization beam splitter 415 after passing through the second polarization conversion area 485a of the fourth polarization converter 485, the second polarization beam splitter 480, the first mirror 400, the first focus controlling unit 435, the third polarization beam splitter 430, the first polarization conversion area 425a of third polarization converter 425, and the first collimating lens 420. In this case, since the reflected signal light L2 is polarization-converted to S-polarized light by the first polarization conversion area 425a of the third polarization converter 425, the reflected signal light L2 is reflected from the fourth polarization beam splitter 415 and directed to the second optical detector 520. As described above, information on the reflected signal light L2 detected by the second optical detector 520 in the recording mode may be used for a focus servo so that the reference light L11 and the signal light L12 are focused on the information plane 665 in the holographic information storage medium 600 by controlling the first and second focus controlling units 435 and 450.

Figure 13:
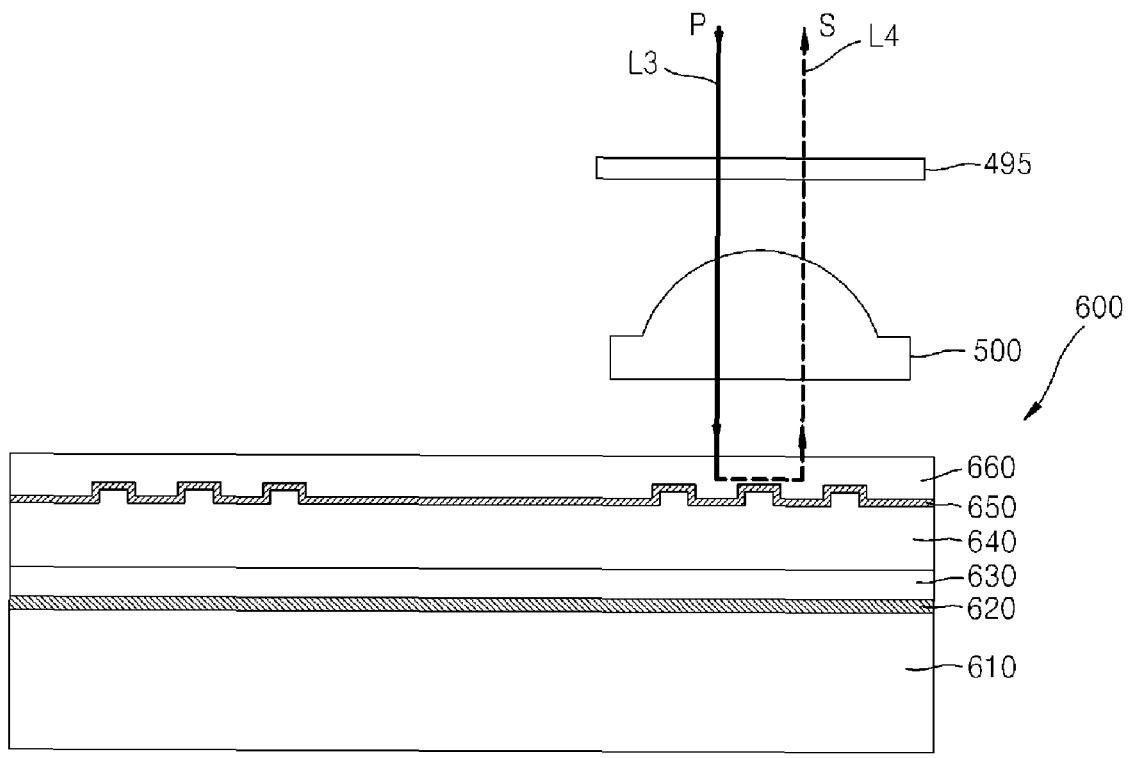
FIG. 13 illustrates a servo light illuminated onto the holographic information storage medium illustrated in FIG. 11 in the servo process.

Servo information detection of the holographic information recording and/or reproducing apparatus according to the current embodiment will now be described with reference to FIG. 13. FIG. 13 illustrates servo light L3 and L4 incident to and reflected from the holographic information storage medium 600 illustrated in FIG. 11. In FIG. 13, since each layer of the holographic information storage medium 600 is similar to those illustrated in FIG. 11, the layers will not be described herein.

Referring to FIG. 13, one-directional polarized light (e.g., the servo light L3 that is P-polarized) is incident to the holographic information storage medium 600 after passing through the quarter-wave plate 495 and the objective lens 500. The servo light L3 is converted from the P-polarized light to a left circular polarized light by the quarter-wave plate 495. The servo light L3 incident to the holographic information storage medium 600 is reflected from the servo layer 650. In this case, since a rotation direction of a polarization vector of the servo light L3 is not changed but a light moving direction is opposite to an original direction, the left circular polarized light is converted to a right circular polarized light. The reflected servo light L4 is converted to an S-polarized light by the quarter-wave plate 495 and moves backward along an optical path of the servo light L3. Referring back to FIG. 10, the reflected servo light L4 passes through the second polarization beam splitter 480 and the wavelength selective beam splitter 465 without a path change, passes through the servo light focus controlling unit 550 and the second collimating lens 545, is reflected from servo light polarization beam splitter 540, and is detected by the second optical detector 560. The detected servo information is used by the optical pickup 400 to perform tracking in the recording or reproduction mode.

Figure 14:
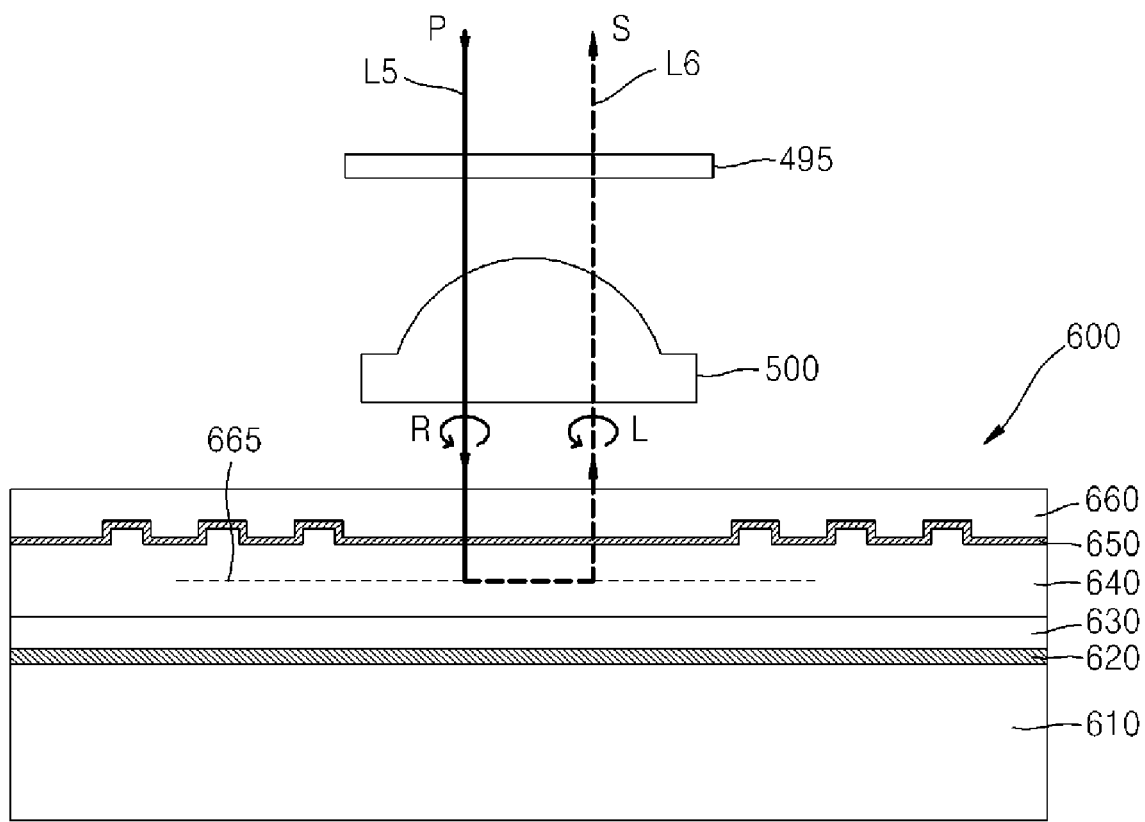
FIG. 14 illustrates a polarization state of a reproduction light illuminated onto the holographic information storage medium illustrated in FIG. 11 by the holographic information recording and/or reproducing apparatus illustrated in FIG. 10.

The reproduction mode of the holographic information recording and/or reproducing apparatus according to the current embodiment will now be described with reference to FIG. 14. FIG. 14 illustrates a polarization state of the reproduction light L5 and L6 incident to the holographic information storage medium 600 illustrated in FIG. 11.

Referring to FIG. 14, for reproduction, reproduction light L5 having the same polarization direction as that of the reference light L11 is illuminated to the holographic information storage medium 600. In this case, since the third and fourth polarization converters 425 and 485 do not perform the polarization conversion operation, the reproduction light L5 is guided to the holographic information storage medium 600 with the same polarization direction as that of the reference light L11 (e.g., a P-polarization direction). The P-polarization of the reproduction light L5 is converted to a right circular polarization R by the quarter-wave plate 495 and is incident to the holographic information storage medium 600 via the objective lens 500. The reproduction light L5 focused on the information plane 665 is reflected from the information plane 665 with information on interference fringes formed on the information plane 665. That is, the reproduction light L5 incident in the right circular polarization state is diffracted (i.e., reflected) due to the interference fringes from the information plane 665, in which information is recorded, and directed to the objective lens 500. Since only an orientation of the reproduction light L6 reflected from the information plane 665 is changed but a rotation direction of an electric field vector is not changed, the reflected reproduction light L6 becomes in the left circular polarization state. The reflected reproduction light L6 having the left circular polarization L is converted to an S-polarized light by the quarter-wave plate 495, is reflected from the second polarization beam splitter 480, passes through the third mirror 475, the second polarization converter 470, the first polarization beam splitter 460, the first mirror 440, and the first focus controlling unit 435, and is directed to the third polarization beam splitter 430. As described above, the reproduction light L6 reflected from the holographic information storage medium 600 is reflected from the third polarization beam splitter 430 and detected by the first optical detector 510.

The holographic information recording and/or reproducing apparatus according to aspects of the present invention has been described with reference to the embodiments described above. In the embodiments described above, although a reference light and a reproduction light have a P-polarized light and a signal light has an S-polarized light, it is understood that aspects of the present invention are not limited thereto, and the polarization states may be opposite according to other aspects. In addition, in the embodiments described above, although the holographic information recording and/or reproducing apparatus performs both recording and reproduction, aspects of the present invention may be applied for recording only or reproduction only. Furthermore, in the embodiments described above, although a wavelength of a servo light is different from that of light for recording or reproduction, aspects of the present invention are not limited thereto. For example, other aspects of the present invention may apply even if servo information and a servo error signal are extracted from the light for recording or reproduction.

As described above, according to aspects of the present invention, by making a signal light and a reference light incident on a single side of a holographic information storage medium, the complexity of an optical system can be reduced, and efficiency of the optical system can be increased.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A holographic information recording and/or reproducing apparatus to record and/or reproduce information to/from a holographic information storage medium, the holographic information recording and/or reproducing apparatus comprising:

a first light source unit to emit a reference light and a signal light in a recording mode, each being linear polarized light and orthogonal to each other;

a first optical path guiding unit to guide the reference light and the signal light emitted by the first light source unit so that the reference light and the signal light cross each other at a first crossing point after passing through different optical paths;

a second optical path guiding unit comprising a first polarization converter located on an optical path of the reference light or the signal light before the first crossing point, a first polarization beam splitter located at the first crossing point of the reference light and the signal light, at least one first optical path converter to guide the reference light and/or the signal light so that the reference light and the signal light cross again at a second crossing point after the first crossing point, a second polarization converter located on the optical path of the signal light before the second crossing point after passing through the first polarization beam splitter, and a second polarization beam splitter located at the second crossing point to unite the optical paths of the reference light and the signal light; and an objective lens unit to illuminate the reference light and the signal light that have passed through the second polarization beam splitter onto a single side of the holographic information storage medium.

2. The holographic information recording and/or reproducing apparatus as claimed in claim 1, wherein the first polarization converter is located on the optical path of the signal light before the first crossing point and converts a polarization direction of the signal light to an orthogonal direction.

3. The holographic information recording and/or reproducing apparatus as claimed in claim 1, wherein the first polarization converter is a half-wave plate.

4. The holographic information recording and/or reproducing apparatus as claimed in claim 1, wherein the second polarization converter converts a polarization direction of the signal light to an orthogonal direction in the recording mode and passes a reproduction light without polarization conversion in a reproduction mode.

5. The holographic information recording and/or reproducing apparatus as claimed in claim 1, wherein the second polarization converter is an active half-wave plate.

6. The holographic information recording and/or reproducing apparatus as claimed in claim 1, wherein the first polarization converter, the second polarization converter, the first polarization beam splitter, the second polarization beam splitter, the at least one first optical path converter, and/or the second polarization converter are combined into one body.

7. The holographic information recording and/or reproducing apparatus as claimed in claim 6, wherein:

the first polarization beam splitter and the second polarization beam splitter are cubic polarization beam splitters; and the at least one first optical path converter comprises a first cubic prism converting the optical path of the signal light and a second cubic prism converting the optical path of the reference light.

8. The holographic information recording and/or reproducing apparatus as claimed in claim 7, wherein:

the first polarization beam splitter and the first cubic prism are combined into one body;

the second polarization beam splitter and the second cubic prism are combined into one body; and the second polarization converter is located between the first cubic prism and the second polarization beam splitter.

9. The holographic information recording and/or reproducing apparatus as claimed in claim 8, wherein:

the second polarization converter is an active half-wave plate;

the second optical path guiding unit further comprises a transparent plate having a same thickness as that of the second polarization converter and located between the first polarization beam splitter and the second cubic prism; and the first and the second polarization beam splitters, the first and the second cubic prisms, the second polarization converter, and the transparent plate are combined into one body.

10. The holographic information recording and/or reproducing apparatus as claimed in claim 1, further comprising:

a first focus controlling unit located on the optical path of the reference light between the first light source unit and the objective lens unit to control a focal depth of the reference light illuminated onto the holographic information storage medium; and a second focus controlling unit located on the optical path of the signal light between the first light source unit and the objective lens unit to control a focal depth of the signal light illuminated onto the holographic information storage medium.

11. The holographic information recording and/or reproducing apparatus as claimed in claim 10, wherein the first and the second focus controlling units are active relay lens units in which at least one lens is driven in an optical axis direction.

12. The holographic information recording and/or reproducing apparatus as claimed in claim 1, further comprising a servo optical system to read servo information recorded on the holographic information storage medium.

13. The holographic information recording and/or reproducing apparatus as claimed in claim 12, wherein the servo optical system comprises:

a second light source unit to emit a servo light that is a linear polarized light and has a different wavelength from that of the first light source;

a servo light polarization beam splitter to split the servo light emitted by the second light source unit and the servo light reflected from the holographic information storage medium to different optical paths; and a servo optical detector to detect the servo light reflected from the holographic information storage medium and split by the servo light polarization beam splitter.

14. The holographic information recording and/or reproducing apparatus as claimed in claim 13, wherein:

the at least one first optical path converter comprises a wavelength selective beam splitter to combine the optical path of the reference light or the signal light after the first polarization beam splitter, and an optical path of the servo light emitted by the second light source unit; and the second polarization beam splitter has a wavelength selectivity such that the servo light is transmitted or reflected.

15. The holographic information recording and/or reproducing apparatus as claimed in claim 13, wherein the servo optical system further comprises a servo light focus controlling unit to control a focal depth of the servo light in the holographic information storage medium.

16. The holographic information recording and/or reproducing apparatus as claimed in claim 1, wherein a numerical aperture of the objective lens unit is a same value for the signal light and the reference light.

17. The holographic information recording and/or reproducing apparatus as claimed in claim 1, wherein a numerical aperture of the objective lens unit for the signal light is smaller than a numerical aperture of the objective lens unit for the reference light.

18. The holographic information recording and/or reproducing apparatus as claimed in claim 1, wherein the information is recorded on a focus as a single bit.

19. The holographic information recording and/or reproducing apparatus as claimed in claim 1, wherein the objective lens unit comprises:
   a quarter-wave plate to polarization-convert the reference light and the signal light to be orthogonally polarized to each other; and
   an objective lens to cause the information to be recorded by interference fringes formed in a depth direction of the holographic information storage medium around a focus formed by directly focusing the reference light on a focal point of the holographic information storage medium, reflecting the signal light from a reflection layer of the holographic information storage medium without polarization conversion, and focusing the reflected signal light on the focal point of the reference light.

20. The holographic information recording and/or reproducing apparatus as claimed in claim 19, wherein the first light source unit comprises:
   a first light source to emit a light; and
   a third polarization converter to polarization-convert the emitted light according to the recording or a reproduction mode.

21. The holographic information recording and/or reproducing apparatus as claimed in claim 20, wherein the third polarization converter polarization-converts the emitted light to have two linear polarization components orthogonal to each other in the recording mode and polarization-converts the emitted light to be in a same polarization direction as that of the reference light in the reproduction mode.

22. The holographic information recording and/or reproducing apparatus as claimed in claim 20, wherein:
   the first light source emits the light having a same polarization direction as that of the reference light; and
   the third polarization converter polarization-converts the emitted light to have two orthogonal linear polarization components in the recording mode and passes the incident light without polarization conversion in the reproduction mode.

23. The holographic information recording and/or reproducing apparatus as claimed in claim 22, wherein the third polarization converter is an active half-wave plate.

24. The holographic information recording and/or reproducing apparatus as claimed in claim 19, wherein the first optical path guiding unit comprises:
   a third polarization beam splitter to split the signal light and the reference light; and
   at least one second optical path converter to guide the split signal light and the reference light to cross each other.

25. The holographic information recording and/or reproducing apparatus as claimed in claim 19, further comprising a first optical detector to detect a reproduction light reflected from the holographic information storage medium in a reproduction mode.

26. The holographic information recording and/or reproducing apparatus as claimed in claim 25, wherein the first optical path guiding unit comprises:
   a third polarization beam splitter to split the signal light and the reference light in the recording mode and to reflect the reproduction light reflected from the holographic information storage medium to the first optical detector along the optical path of the reference light in the reproduction mode; and
   at least one second optical path converter to guide the split signal light and the reference light to cross each other in the recording mode, and to guide the reproduction light reflected from the holographic information storage medium to move backward along the optical path of the reference light to the third polarization beam splitter in the reproduction mode.

27. The holographic information recording and/or reproducing apparatus as claimed in claim 25, wherein the second polarization converter polarization-converts the signal light reflected from the holographic information storage medium in the recording mode so that the reflected signal light comprises a portion having a polarization component of the reference light on the same optical path and causes the reflected signal light to move backward along the optical path of the reference light to be detected by the first optical detector.

28. The holographic information recording and/or reproducing apparatus as claimed in claim 1, wherein the objective lens unit comprises:
   a fourth polarization converter to polarization-convert the reference light and the signal light to a linear polarized light in a same polarization direction;
   a quarter-wave plate to polarization-convert the reference light and the signal light to a same directional circular polarized light; and
   an objective lens to cause the information to be recorded by interference fringes formed in a depth direction of the holographic information storage medium around a focus formed by directly focusing the reference light on a focal point of the holographic information storage medium, reflecting the signal light from a reflection layer of the holographic information storage medium with polarization conversion, and focusing the reflected signal light on the focal point of the reference light.

29. The holographic information recording and/or reproducing apparatus as claimed in claim 28, wherein the first light source unit comprises:
   a first light source to emit a light; and
   a third polarization converter to polarization-convert the emitted light according to the recording mode or a reproduction mode.

30. The holographic information recording and/or reproducing apparatus as claimed in claim 28, wherein the third polarization converter polarization-converts the emitted light to have two linear polarization components orthogonal to each other in the recording mode and polarization-converts the emitted light to have a same polarization as that of the reference light in the reproduction mode.

31. The holographic information recording and/or reproducing apparatus as claimed in claim 29, wherein:
   the first light source emits the light having a same polarization as that of the reference light; and
   the third polarization converter polarization-converts the emitted light to have two linear polarization components orthogonal to each other in the recording mode and passes the emitted light without polarization conversion in the reproduction mode.

32. The holographic information recording and/or reproducing apparatus as claimed in claim 31, wherein:
   the third polarization converter comprises a first transparent area to always pass the emitted light without polarization conversion regardless of the recording mode or the reproduction mode and a first polarization conversion area to polarization-convert the emitted light in the recording mode, and
   the fourth polarization converter comprises a second transparent area and a second polarization conversion area corresponding to the first transparent area and the first polarization conversion area, respectively, the second transparent area always passing incident light without polarization conversion regardless of the recording mode or the reproduction mode, and the second polarization conversion area polarization-converting the emitted light in the recording mode.

33. The holographic information recording and/or reproducing apparatus as claimed in claim 29, further comprising:
a fourth polarization beam splitter located between the first light source and the third polarization converter; and
a second optical detector located in a side of the fourth polarization beam splitter,
wherein the signal light reflected from the holographic information storage medium is polarization-converted in a same direction as that of polarized light of the reference light on a same optical path by the fourth polarization converter, moves backward along the optical path of the reference light, is polarization-converted by the third polarization converter, is split by the fourth polarization beam splitter, and is detected by the second optical detector.

34. The holographic information recording and/or reproducing apparatus as claimed in claim 28, further comprising a first optical detector to detect a reproduction light reflected from the holographic information storage medium in the reproduction mode.

35. The holographic information recording and/or reproducing apparatus as claimed in claim 34, wherein the first optical path guiding unit comprises:
a third polarization beam splitter to split the signal light and the reference light in the recording mode and to reflect the reproduction light reflected from the holographic information storage medium to the first optical detector along the optical path of the reference light in the reproduction mode; and
at least one second optical path converter to guide the split signal light and the reference light to cross each other in the recording mode and to guide the reproduction light reflected from the holographic information storage medium to move backward along the optical path of the reference light to the third polarization beam splitter in the reproduction mode.

36. A holographic information recording and/or reproducing apparatus to record and/or reproduce information to/from a holographic information storage medium, the holographic information recording and/or reproducing apparatus comprising:
a first light source unit to emit a reference light and a signal light in a recording mode, each being linear polarized light and orthogonal to each other;
a first optical path guiding unit to guide the reference light and the signal light emitted by the first light source unit so that the reference light and the signal light cross each other at a first crossing point after passing through different optical paths;
a second optical path guiding unit to guide the reference light and/or the signal light so that the reference light and the signal light cross again at a second crossing point after passing through different optical paths after the first crossing point; and
an objective lens unit to illuminate the reference light and the signal light that have passed through the second polarization beam splitter onto a single side of the holographic information storage medium.

37. The holographic information recording and/or reproducing apparatus as claimed in claim 36, wherein the second optical path guiding unit comprises a first polarization converter located on the optical path of the signal light before the first crossing point to convert a polarization direction of the signal light to an orthogonal direction.

38. The holographic information recording and/or reproducing apparatus as claimed in claim 37, wherein the second optical path guiding unit comprises a second polarization converter to convert the polarization direction of the signal light to an orthogonal direction in the recording mode and to pass a reproduction light without polarization conversion in a reproduction mode.

39. The holographic information recording and/or reproducing apparatus as claimed in claim 36, further comprising:
a first focus controlling unit located on the optical path of the reference light between the first light source unit and the objective lens unit to control a focal depth of the reference light illuminated onto the holographic information storage medium; and
a second focus controlling unit located on the optical path of the signal light between the first light source unit and the objective lens unit to control a focal depth of the signal light illuminated onto the holographic information storage medium.

40. The holographic information recording and/or reproducing apparatus as claimed in claim 36, further comprising a servo optical system to read servo information recorded on the holographic information storage medium.

41. The holographic information recording and/or reproducing apparatus as claimed in claim 40, wherein the servo optical system comprises:
a second light source unit to emit a servo light that is a linear polarized light and has a different wavelength from that of the first light source;
a servo light polarization beam splitter to split the servo light emitted by the second light source unit and the servo light reflected from the holographic information storage medium to different optical paths; and
a servo optical detector to detect the servo light reflected from the holographic information storage medium and split by the servo light polarization beam splitter.

42. The holographic information recording and/or reproducing apparatus as claimed in claim 36, wherein the objective lens unit comprises:
a quarter-wave plate to polarization-convert the reference light and the signal light to be orthogonally polarized to each other; and
an objective lens to cause the information to be recorded by interference fringes formed in a depth direction of the holographic information storage medium around a focus formed by directly focusing the reference light on a focal point of the holographic information storage medium, reflecting the signal light from a reflection layer of the holographic information storage medium without polarization conversion, and focusing the reflected signal light on the focal point of the reference light.

43. The holographic information recording and/or reproducing apparatus as claimed in claim 42, wherein the first light source unit comprises:
a first light source to emit a light; and
a third polarization converter to polarization-convert the emitted light according to the recording or a reproduction mode.

44. The holographic information recording and/or reproducing apparatus as claimed in claim 42, further comprising a first optical detector to detect a reproduction light reflected from the holographic information storage medium in a reproduction mode.

45. A holographic information recording and/or reproducing apparatus to record and/or reproduce information to/from a holographic information storage medium, the holographic information recording and/or reproducing apparatus comprising:
- a first optical path guiding unit to guide a reference light and a signal light, each being linear polarized light and orthogonal to each other, so that the reference light and the signal light cross each other at a first crossing point after passing through different optical paths;
- a second optical path guiding unit to guide the reference light and/or the signal light so that the reference light and the signal light cross again at a second crossing point after passing through different optical paths after the first crossing point; and
- an objective lens unit to illuminate the reference light and the signal light that have passed through the second polarization beam splitter onto a single side of the holographic information storage medium.

46. A method of recording information to a holographic information storage medium, the method comprising:
- emitting a reference light and a signal light, each being linear polarized and orthogonal to each other;
- guiding the emitted reference light and the emitted signal light so that the reference light and the signal light cross each other at a first crossing point after passing through different optical paths;
- uniting the optical paths of the reference light and the signal light; and
- illuminating the reference light and the signal light onto a single side of the holographic information storage medium.

* * * * *